United States Patent [19]

Ikeda et al.

[11] Patent Number: 5,351,222

[45] Date of Patent: Sep. 27, 1994

[54] DISK STORAGE APPARATUS INCLUDING A SINGLE POWER SUPPLY HYSTERESIS COMPARATOR HAVING A SYMMETRICAL CHARACTERISTIC

[75] Inventors: Toru Ikeda; Shigenori Yanagi, both of Kawasaki, Japan

[73] Assignee: Fujitsu Limited, Japan

[21] Appl. No.: 957,521

[22] Filed: Oct. 6, 1992

[30] Foreign Application Priority Data

Oct. 8, 1991 [JP] Japan .................. 3-260317
Oct. 9, 1991 [JP] Japan .................. 3-262016

[51] Int. Cl.⁵ .................................... G11B 7/085
[52] U.S. Cl. .................... 369/32; 369/44.25; 369/44.28; 369/44.29; 369/44.34; 369/54
[58] Field of Search ......... 369/32, 44.25, 44.28–44.29, 369/44.32, 44.34–44.36, 54, 124; 307/290, 358–359, 362, 494

[56] References Cited

U.S. PATENT DOCUMENTS

| | | | |
|---|---|---|---|
| 3,718,864 | 2/1973 | Kelly et al. ............... | 307/290 X |
| 4,339,727 | 7/1982 | Kage et al. ............... | 307/359 X |
| 4,418,406 | 11/1983 | Ogawa ..................... | 307/359 X |
| 4,549,099 | 10/1985 | Yamada et al. .......... | 307/359 |
| 5,161,137 | 11/1992 | Suzuki ....................... | 369/44.28 X |

FOREIGN PATENT DOCUMENTS 59-169220  9/1984  Japan .
1-276919  11/1989  Japan .
3-36813  2/1991  Japan .

*Primary Examiner*—W. R. Young
*Attorney, Agent, or Firm*—Greer, Burns & Crain, Ltd.

[57] ABSTRACT

A rectangular wave generator includes a comparator having a first input terminal receiving an input signal, a second input terminal, and an output terminal. The comparator slices the input signal at a hysteresis voltage so that a rectangular wave is output via the output terminal. The generator also includes a differentiating circuit connected between the output terminal and the second input terminal. The differentiating circuit functions as a feedback circuit. In lieu of the differentiating circuit, it is possible to use a feedback circuit connected between the output terminal and the second input terminal, the feedback circuit comprising a control unit for changing a feedback quantity of the differentiating circuit in accordance with variations in a frequency of the input signal.

11 Claims, 20 Drawing Sheets

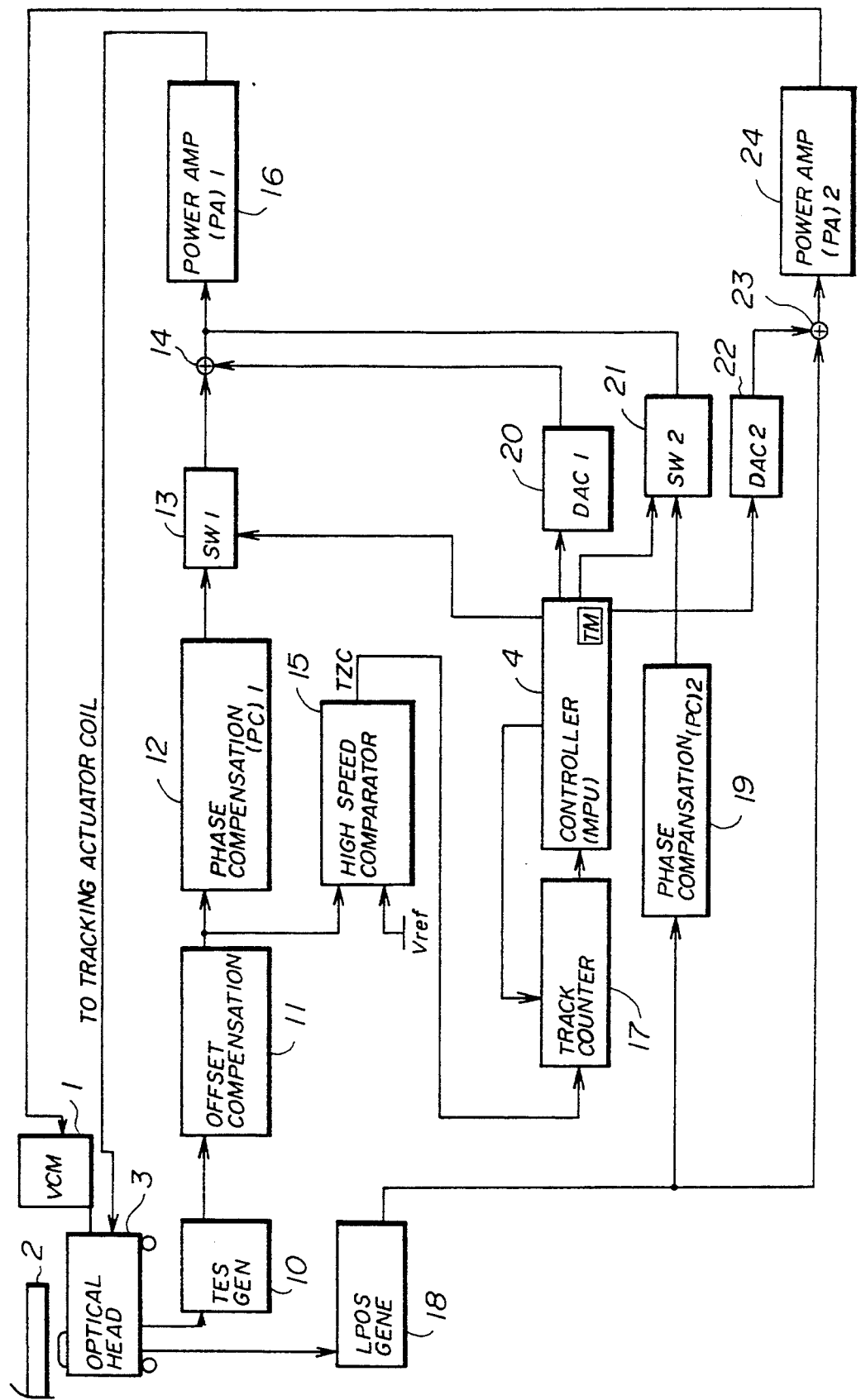

IN CHARGE $$Va = +Vcc \frac{R_3}{R_2+R_3} e^{-\frac{t}{z}} + Vref$$

FIG.9A
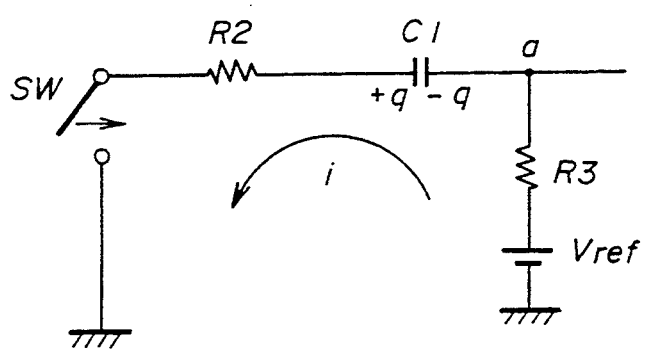
FIG.9B
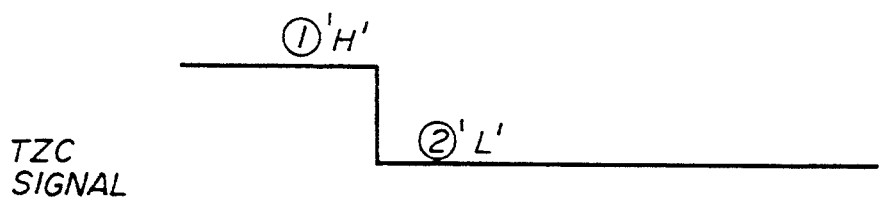
$$Va = -Vcc \frac{R_3}{R_2 - R_3} e^{-\frac{t}{z}} + Vref$$

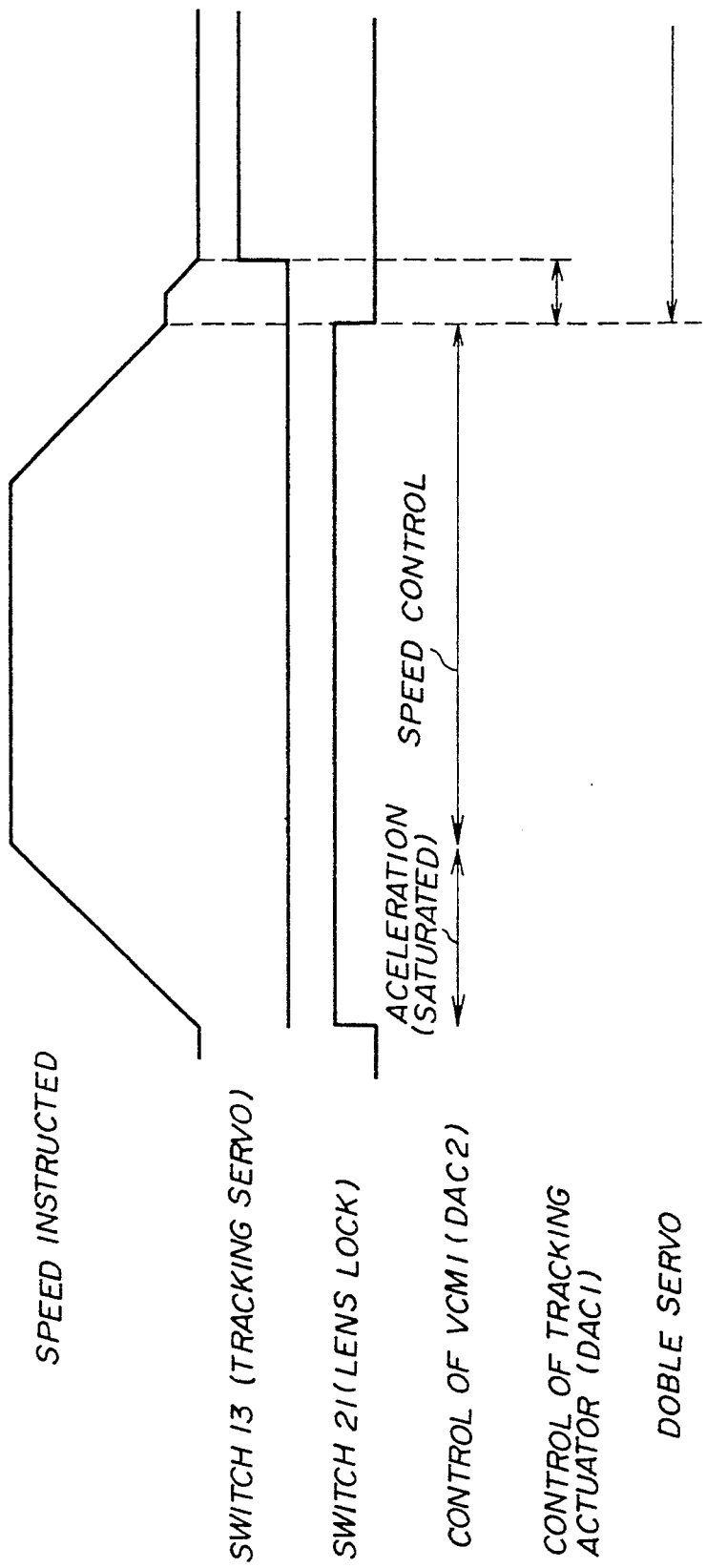

DISK STORAGE APPARATUS INCLUDING A SINGLE POWER SUPPLY HYSTERESIS COMPARATOR HAVING A SYMMETRICAL CHARACTERISTIC

BACKGROUND OF THE INVENTION

1. Field of the Invention

The present invention generally relates to a rectangular wave generator for generating a rectangular wave from an analog input signal, and more particularly to a rectangular wave generator including a hysteresis comparator in which an analog input signal is sliced at a predetermined voltage and an output signal of a rectangular wave is fed back to the input of the hysteresis comparator. Further, the present invention is concerned with a disk storage apparatus using such a rectangular wave generator, such as an optical disk apparatus or a magneto-optic disk apparatus.

2. Description of the Prior Art

An optical disk apparatus or a magneto-optic disk apparatus has an advantage of a large storage capacity, and is attractive for use as an external storage apparatus. Hereinafter, an optical disk apparatus is referred to as a disk apparatus including a magneto-optic disk apparatus.

In a conventional optical disk apparatus, a tracking error signal is generated from a light reflected by an optical disk, and is sliced at a predetermined voltage level by means of a comparator. An output signal of the comparator serves as a track crossing signal used for detecting the track position and the seek speed in order to control the seek operation. Such a comparator should generate the track crossing signals with high precision even if a noise signal and/or an offset signal is superimposed on the tracking error signal.

FIG. 1 is a block diagram of a conventional optical disk apparatus, FIGS. 2A, 2B and 2C are diagrams showing a tracking zero-cross signal, and FIG. 3A and 3B are diagrams showing a track crossing operation. Referring to FIG. 1, the conventional optical disk apparatus comprises an optical head 3, and a motor 1, such as a voice coil motor (VCM). The optical head 3 projects a light beam onto an optical disk (magnet-optic disk) 2. The motor 1 moves the optical head 3 in the radial directions of the optical disk 2.

As shown in FIG. 2A, the optical disk 2 has a track disposed between guide grooves. A light beam emitted from the optical head 3 and reflected by the optical disk 2 is received by a two-divided photodetector 30 via an objective lens of the optical head 3, as shown in FIG. 2B. Two detection signals A and B from two divided light receiving surfaces of the photodetector 30 are applied to a tracking error signal (TES) generating circuit 10 shown in FIG. 1, which generates a tracking error signal TES indicating the difference between the two detection signals A and B. An offset compensation circuit 11 executes an offset compensation operation on the tracking error signal TES. A phase compensation circuit 12 compensates for the phases of high-frequency components of an output signal of the offset compensation circuit 11. An output signal of the phase compensation circuit 12 is applied to a power amplifier 16 via a tracking servo switch 13 and an adder 14. The power amplifier 16 drives a tracking actuator coil (not shown) for moving the objective lens 31 in the track directions, so that the light beam follows the target track.

The tracking error signal TES generated by the TES generator 10 has a sine wave having a cycle corresponding to an operation in which the light beam crosses a track. The tracking error signal TES is applied to a high-speed comparator 15, in which the signal TES is sliced at a level of zero. In this manner, as shown in FIG. 2A, the high-speed comparator 15 generates a tracking zero-cross signal TZC. A track counter 17 counts the number of pulses of the tracking zero-cross signal TZC. A controller (MPU) 4 detects the position and speed of the optical head 3 from the counter value of the track counter 17, which is periodically read in response to an output signal of an internal timer TM. Then, the controller 4 controls, on the basis of the position and speed of the optical head 3, the voice coil motor 1 via a digital-to-analog (D/A) converter (DAC2) 22, and a power amplifier 24.

A lens position signal generating circuit 18 generates a lens position signal LPOS indicating the position of the objective lens 81 of the optical head 3. A phase compensation circuit 19 compensates for the phases of high-frequency components of the lens position signal LPOS. The controller 4 turns ON switch 21 during a seek operation, and thereby the lens position signal LPOS from the phase compensation circuit 19 is applied to the power amplifier 16. In this manner, the objective lens 31 is locked.

A digital-to-analog converter (DAC1) converts a tracking actuator control signal generated by the controller 4 into an analog signal at the end of the seek operation. The analog tracking actuator control signal from the D/A converter 20 is applied to the adder 14, so that the positioning of the optical head 3 can be stabilized.

As shown in FIGS. 2A–2C and 3A–3B, the comparator 15 slices the tracking error signal TES at a fixed slice level (a center level Vref of an analog voltage range), and thereby the tracking zero-cross signal TZC is generated.

As shown in FIG. 3A, identification areas (ID) are provided for the tracks formed on the optical disk 2. In each of the identification areas ID (Which are also referred to as "prepit areas"), the guide grooves are broken. Hence, a spike-like noise is superimposed on the tracking error signal TES, as shown in FIG. 3B. The tracking error signal TES is broken when the light beam passes over each of the identification areas ID. Hence, as shown in FIG. 3B, unwanted pulses are included in the tracking zero-cross signal TZC, and prevent track crossing from being precisely followed. As a result, a tracking position error and a speed error are generated.

FIGS. 4A, 4B and 4C are circuit diagrams of the high-speed comparator 15 shown in FIG. 1. The high-speed comparator 15 shown in these figures comprises a hysteresis comparator 150 proposed in Japanese Laid-Open Patent Publication No. 3-36813. The hysteresis comparator shown in FIG. 4A is capable of eliminating noise. The tracking error signal TES is applied to a negative terminal of the comparator and the aforementioned analog reference voltage Vref (DC offset voltage) is applied to a positive terminal thereof via a resistor R3. A resistor R2 connects the positive terminal and an output terminal of the comparator 150 to each other. An output voltage obtained at the output terminal of the comparator 150 is forwardly fed back to the positive terminal via the resistor R2. A positive power supply voltage Vcc and ground potential are applied to the comparator 150. A resistor R1 is connected to the Vcc line and the output terminal of the comparator 150.

The operation of the comparator 15 will now be described with reference to FIGS. 4B and 4C. FIG. 4B is an equivalent circuit diagram of the comparator 15, in which low and high levels of the output signal of the comparator 15 are expressed by a switch. Assuming that the resistance of the resistor R1 is much smaller than the resistances of the resistors R2 and R3, the equivalent circuit shown in FIG. 4B can be rewritten, as shown in FIG. 4C. A potential Vh obtained at a node a when the output signal of the comparator 15 is at a high level can be expressed as follows:

$$Vh = [R3/(R2 + R3)](Vcc - Vref) + Vref \qquad (1)$$
$$= (R3 \cdot Vcc + R2 \cdot Vref)/(R2 + R3).$$

A potential V1 obtained a the node a when the output signal of the comparator 15 is at a low-level can be expressed as follows:

$$Vl = [R3/(R2 + R3)](0 - Vref) + Vref \qquad (2)$$
$$= (R2 \cdot Vref)/(R2 + R3).$$

When the analog reference voltage Vref is set to be the center of the range of the voltage Vh, a potential Vh' of the node a obtained when the output voltage is high with respect to the analog reference voltage Vref is written as follows:

$$Vh' = Vh - Vref \qquad (3)$$
$$= R3(Vcc - Vref)/(R2 + R3).$$

A potential V1' of the node a obtained when the output voltage is low with respect to the above analog reference voltage Vref is written as follows:

$$Vl' = Vl - Vref \qquad (4)$$
$$= (-R3 \cdot Vref)/(R2 + R3).$$

From the expressions (3) and (4), the potentials Vh' and Vl' with respect to the analog reference voltage Vref are equal to each other when Vcc=2·Vref. In this case, positive and negative hystereses are symmetrical to each other with respect to the analog reference voltage Vref which is the center of the voltage range.

FIGS. 5A and 5B are diagrams showing disadvantages of the comparator 15 shown in FIG. 4A. As shown in FIG. 5A, a servo-zero point of the tracking error signal TES is biased to the analog reference voltage Vref. A hysteresis voltage (output voltage) of the comparator 15 varies so that the output voltage is switched to Vh when the tracking error signal TES becomes lower than the hysteresis voltage, and is switched to Vl when the tracking error signal TES becomes higher than the hysteresis voltage- In this manner, the tracking zero-cross signal TZC is not affected by noise contained in the tracking error signal TES.

In a case where a single-polarity power supply system, such as a 0-5V power supply system is employed, it is necessary to set the analog reference voltage Vref between the ground potential (zero volts) and Vcc (+5V). In this case, the analog reference voltage Vref functions as an analog voltage of zero volt, and analog circuits operate in the plus and minus operation ranges.

For example, as shown in FIG. 5B, the analog reference voltage Vref is set equal to 1.8V (analog zero volt) when the ground potential is equal to 0V and the Vcc is equal to +5V. In this case, the plus operation range is not symmetrical with the minus operation range. Hence, as shown in FIG. 5A, a variation in the hysteresis voltage is not symmetrical with respect to the analog reference voltage Vref equal to +5V. Such an asymmetry of the hysteresis voltage with respect to the analog reference voltage results in the following disadvantages.

As shown in FIG. 5A, the positive hysteresis voltage with respect to the analog reference voltage Vref is smaller than the negative hysteresis voltage. A noise which occurs when the tracking error signal TES is negative with respect to the analog reference voltage Vref is detected since the operational margin of the positive hysteresis voltage is small. Hence, the tracking zero-cross signal TZC has an erroneous detection pulse, as shown in FIG. 5A.

If the tracking error signal TES itself has an error (it has an offset on the positive side in the case shown in FIG. 5A), the operational margin with respect to such an offset of the tracking error signal TES is small, and erroneous detection will take place.

In the case where positive and negative power supply systems are employed, analog circuits which operate by means of the positive and negative power supply systems must be used. Further, the positive and negative power supply systems are complex and large size. Hence, a compact optical disk apparatus cannot be produced.

SUMMARY OF THE INVENTION

It is a general object of the present invention to provide a hysteresis comparator in which the above-mentioned disadvantages are eliminated.

A more specific object of the present invention is to provide a hysteresis comparator that can be driven by a single-polarity power supply system and that has a symmetrical hysteresis characteristic.

The above objects of the present invention are achieved by a rectangular wave generator comprising: a comparator having a first input terminal receiving an input signal, a second input terminal, and an output terminal, the comparator slicing the input signal at a hysteresis voltage so that a rectangular wave is output via the output terminal; and a differentiating circuit connected between the output terminal and the second input terminal, the differentiating circuit functioning as a feedback circuit.

The above objects of the present invention are also achieved by a rectangular wave generator comprising: a comparator having a first input terminal having an input signal, a second input terminal, and an output terminal, the comparator slicing the input signal at a hysteresis voltage so that a rectangular wave is output via the output terminal; and a feedback circuit connected between the output terminal and the second input terminal, the feedback circuit comprising control means for changing a feedback quantity of the differentiating circuit in accordance with variations in the frequency of the input signal.

Another object of the present invention is to provide a disk storage apparatus having the above-mentioned rectangular wave generator.

This object of the present invention is achieved by a disk storage apparatus comprising: an optical scanning system movable with respect to a disk-shaped medium, the optical scanning system generating an electric read signal obtained by optically scanning the disk-shaped medium; reproducing means, coupled to the optical scanning system, for reproducing information from the electric read signal; and seek control means, coupled to the optical scanning system, for generating a seek control signal from the electric read signal. The seek control means comprises: position error signal generating means for generating a position error signal from the electric signal, the position error signal indicating an error in a position of tracking by means of the optical scanning system; and the above-mentioned rectangular wave generator.

BRIEF DESCRIPTION OF THE DRAWINGS

Other objects, features and advantages of the present invention will become more apparent from the following detailed description when read in conjunction with the accompanying drawings, in which:

FIG. 1 is a block diagram of a conventional optical disk apparatus;

FIGS. 9A and 9B are diagrams showing the operation of the hysteresis comparator shown in FIG. 6;

FIG. 12 is a waveform diagram showing the operation of the optical disk apparatus shown in FIG. 11;

DESCRIPTION OF THE PREFERRED EMBODIMENTS

Figure 6:
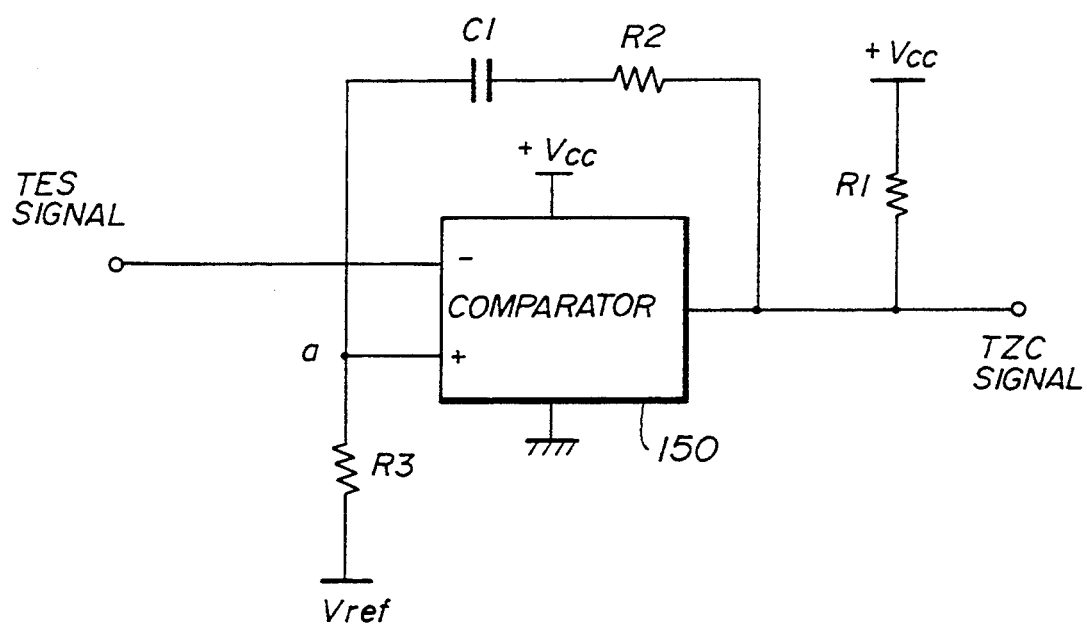
FIG. 6 is a circuit diagram of a hysteresis comparator according to a first embodiment of the present invention.

FIG. 6 is a circuit diagram of a hysteresis comparator 250 according to the first embodiment of the present invention. The hysteresis comparator 250 shown in FIG. 6 comprises the aforementioned comparator 150, the resistors R1, R2 and R3, and a capacitor C1. A series circuit having the resistor R2 and the capacitor C1 is connected between the output terminal of the comparator 150 and the positive input terminal thereof. The analog reference voltage Vref is applied to the positive terminal of the comparator 150 via the resistor R3. The voltage Vcc is applied to the output terminal of the comparator 150 via the resistor R1.

The above series circuit functions as a differentiating circuit. Hence, it is possible to forwardly feed back the output signal of the comparator 150 to the positive input terminal thereof by means of an AC coupling. A quantity obtained by differentiating a variation in the output voltage of the comparator 150 is fed back to the positive input signal in lieu of the conventional DC coupling feedback of a voltage corresponding to the difference between the output voltage and the analog reference voltage Vref. Hence, the fed back quantity is not affected by the analog reference voltage, and thus a symmetrical hysteresis characteristic can be obtained.

It is preferable that the time constant of the R2-C1 differentiating circuit be determined so that the attenuation time of the R2-C1 differentiating circuit is longer than the cycle of the input signal. In this manner, a hysteresis having a predetermined width can be obtained. It is also preferable that the feedback quantity fed back by means of the R2-C1 differentiating circuit is less than the amplitude of the input signal. Hence, the hysteresis width of the input signal does not exceed the amplitude of the input signal, and the input signal can be suitably sliced.

Figure 7A:
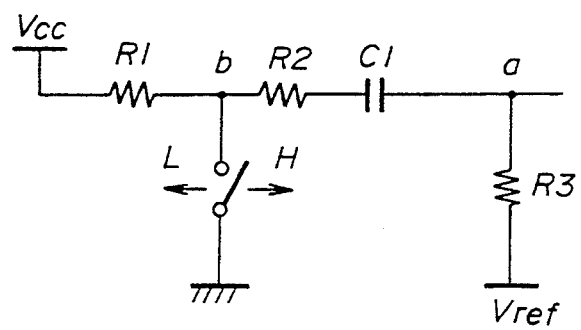
FIGS. 7A and 7B are diagrams of equivalent circuits of the hysteresis comparator shown in FIG. 6.
Figure 7B:
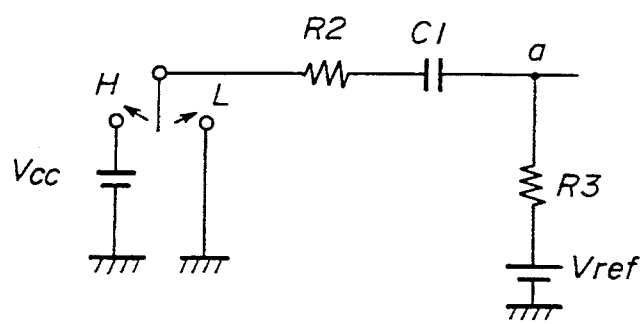

FIG. 7A is an equivalent circuit diagram of the hysteresis comparator shown in FIG. 6, and FIG. 7B shows an equivalent circuit obtained when the resistance of the resistor R1 is much smaller than the resistances of the resistors R2 and R5.

The operations of the equivalent circuits shown in FIGS. 7A and 7B are observed when the output signal of the hysteresis comparator changes from the low level to the high level. At this time, in FIG. 7B, the voltage Vcc is applied to the resistor R2, and a current flows from the voltage Vcc to the voltage Vref through the resistor R2, the capacitor C1 and the resistor R5. When a charge stored in the capacitor C1 is denoted by q, current i is dq/dt, a voltage Vc developing across the capacitor C1 is q/C1, and a voltage drop Vr developing across the R2-R3 series circuit is (R2+R3)·i. Hence, the difference between the voltages Vref and Vcc is represented as follows:

$$Vcc - Vref = (R2 + R3)(dq/dt) + (1/C1)q \quad (5).$$

By rewriting the expression (5), the following is obtained:

$$C1(R2 + R3)(dq/dt) + q = C1(Vcc - Vref) \quad (6)$$
$$dq/[C1(Vcc - Vref) - q] = dt/[C1(R2 + R3)].$$

By integrating both sides of the expression (6), the following expression (7) is obtained:

$$\ln[C1(Vcc - Vref) - q] = \{1/[C1(R2 + R3)]\}t + K \quad (7)$$

where K is an integration constant. By inserting $-\ln Qk$ for K, the expression (7) can be rewritten as follows:

$$\ln\{[C1(Vcc - Vref) - q]/Qk\} = -\{1/[C1(R2 + R3)]\}t. \quad (8)$$

From the expression (8), the following is obtained:

$$[C1(Vcc - Vref) - q]/Qk = e^{-t/[C1(R2+R3)]} \quad (9)$$
$$q = C1(Vcc - Vref) - Qk \cdot e^{-t/[C1(R2+R3)]}.$$

By rewriting the expression (9) using an initial condition that $q0 = -C1 \cdot Vref$, and $t=0$, the following is obtained:

$$-C1 \cdot Vref = C1(Vcc - Vref) - Qk$$

and the integration constant Qk is expressed as:

$$Qk = C1 \cdot Vcc.$$

By substituting the above into the equation (9), the charge quantity q is as follows:

$$q = C1(Vcc - Vref) - C1 \cdot Vcc \cdot e^{-t/[C1(R2+R3)]} \quad (10)$$
$$q = C1 \cdot Vcc(1 - e^{-t/[C1(R2+R3)]}) - C1 \cdot Vref.$$

Hence, the voltage Vc developing across the capacitor C1 may be written as follows:

$$Vc = Vcc(1 - e^{-t/[C1(R2+R3)]}) - Vref \quad (11).$$

The current i is obtained by differentiating the expression (10):

$$i = dq/dt = [Vcc/(R2 + R3)]e^{-t/[C1(R2+R3)]}. \quad (12)$$

Thus, the potential Va of the node a is as follows:

$$Va = i \cdot R3 + Vref \quad (13)$$
$$= [(R3 \cdot Vcc)/(R2 + R3)] \cdot e^{-t/[C1(R2+R3)]} + Vref.$$

Figure 8A:
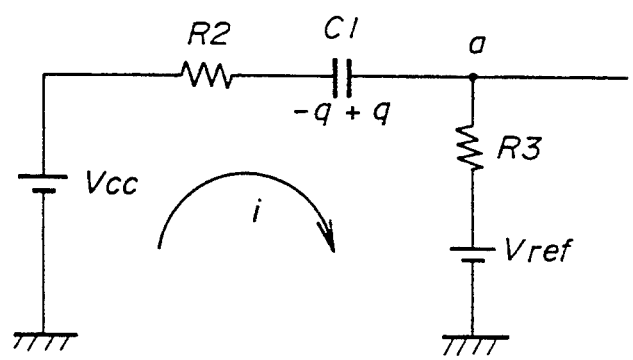
FIGS. 8A and 8B are diagrams showing the operation of the hysteresis comparator shown in FIG. 6.
Figure 8B:
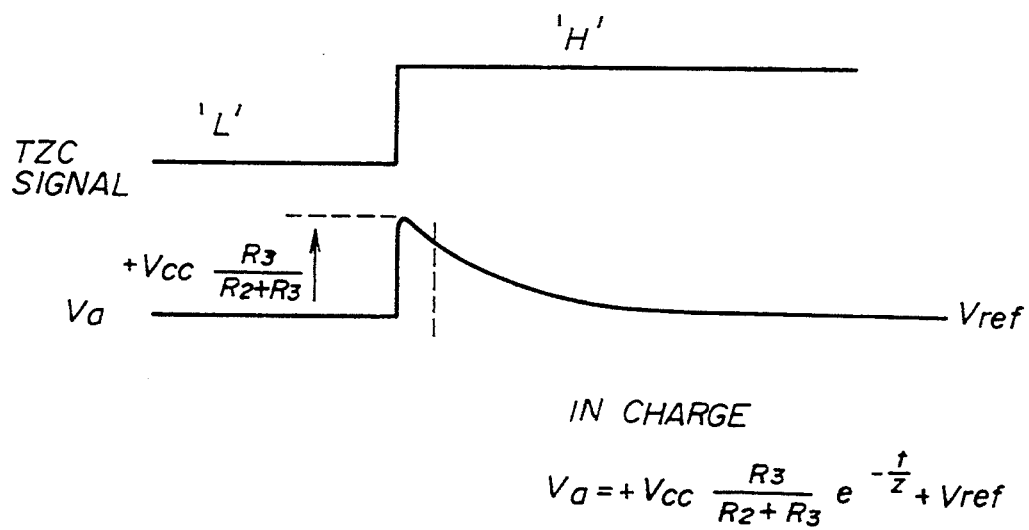

As shown in FIG. 8B, when the tracking zero-cross signal TZC changes from the low level to the high level, the potential Va of the node a increases to a voltage of $Vcc \cdot R3/(R2+R3)$, and then attenuates. Finally, the potential Va settles at the analog reference voltage Vref.

A description will now be given, with reference to FIGS. 9A and 9B, of the operation of the equivalent circuit shown in FIG. 7B when the output voltage thereof changes from the high level to the low level. A change of the output voltage from the high level to the low level is equivalent to an operation in which the resistor R2 is grounded by a switch SW (FIG. 9A), and current i flows from the voltage Vref to the ground via the resistor R3, the capacitor C1 and the resistor R2.

When a charge stored in the capacitor C1 is denoted as q, current i is dq/dt [A], the voltage Vc developing across the capacitor C1 is q/C1, and the voltage drop Vr developing across the series circuits of resistors R2 and R3 is $(R2+R3) \cdot i$. Hence, the analog reference voltage Vref is expressed as follows:

$$Vref = (R2+R3)(dq/dt) + (1/C1)q \quad (14).$$

By rewriting the expression (14) and integrating both sides of the rewritten expression (14), the following expression is obtained:

$$C1(R2 + R3)(dq/dt) + q = C1 \cdot Vref \quad (15)$$
$$(dq)/(C1 \cdot Vref - q) = (dt)/[C1(R2 + R3)]$$
$$\ln(C1 \cdot Vref - q) = \{1/[C1(R2 + R3)]\}t + K$$

where K is an integration constant. By substituting $-\ln Qk$ for K, the expression (15) can be rewritten as follows:

$$\ln[(C1 \cdot Vref - q)/Qk] = [1/(C1(R2 + R3)]t. \quad (16)$$

The following expression (17) is obtained from the expression (16):

$$(C1 \cdot Vref - q)/Qk = e^{-t/[C1(R2+R3)]}$$
$$q = C1 \cdot Vref - Qk \cdot e^{-t/[C1(R2+R3)]} \quad (17).$$

By rewriting the expression (17) using an initial condition that $q0 = -C1(Vcc-Vref)$, and $t=0$, the following is obtained:

$$-C1(Vref-Vref) = C1 \cdot Vref - Qk$$

and the integration constant Qk is expressed as:

$$Qk = C1 \cdot Vcc.$$

By substituting the above into the equation (17), the charge quantity q is as follows:

$$q \leq C1 \cdot Vref - C1 \cdot Vcc \cdot e^{-5/[C1(R2+R3)]} \quad (18).$$

Hence, the voltage Vc ($=q/C1$) developing across the capacitor C1 may be written as follows:

$$Vc = Vref - Vcc \cdot e^{-5/[C1(R2+R3)]} \quad (19).$$

By differentiating the expression (18), the current i is expressed as follows:

$$i = (Vcc)/(R2+R3) \cdot e^{-t/[C1(R2+R3)]} \quad (20).$$

Hence, the potential Va of the node a is written as follows:

$$Va = -iR3 + Vref \quad (21)$$
$$= -[(R3 \cdot Vcc)/(R2 + R3)] \cdot e^{-t/[C1(R2+R3)]} + Vref.$$

That is, as shown in FIG. 9B, when the ZO tracking zero-cross signal TZC changes from the high level to the low level, the voltage Va of the node a decreases to $(Vcc \cdot RB)/(R2+R3)$, and then attenuates. Finally, the voltage Va settles at the analog reference voltage Vref.

The time constant $1/[C1\ (R2+R3)]$ of the differentiating circuit is set to a small value so that the attenuation time is lengthened, the expected minimum period of the tracking error signal TES is obtained at positions indicated by broken lines shown in FIGS. 8B and 9B. In this case, the feedback quantity is equal to $\pm Vcc \cdot R3/(R2+R3)$ can be obtained.

Figure 10A:
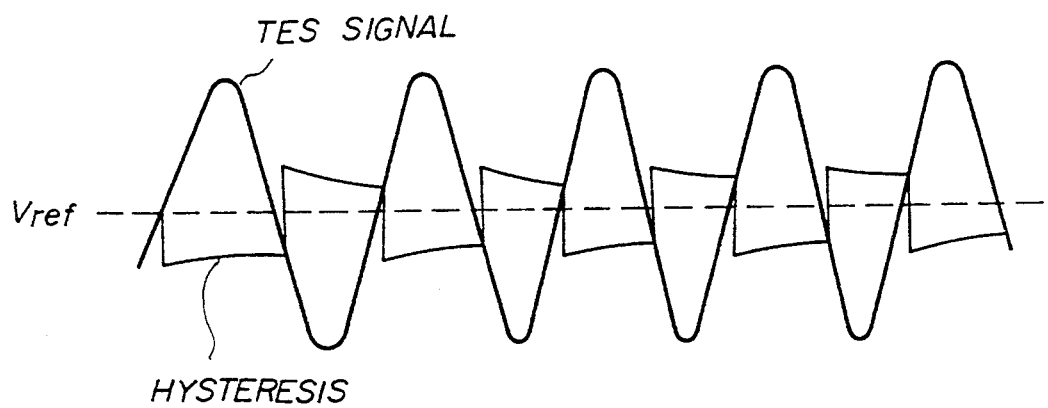
FIGS. 10A and 10B are waveform diagrams showing the operation of the hysteresis comparator shown in FIG. 6.
Figure 10B:
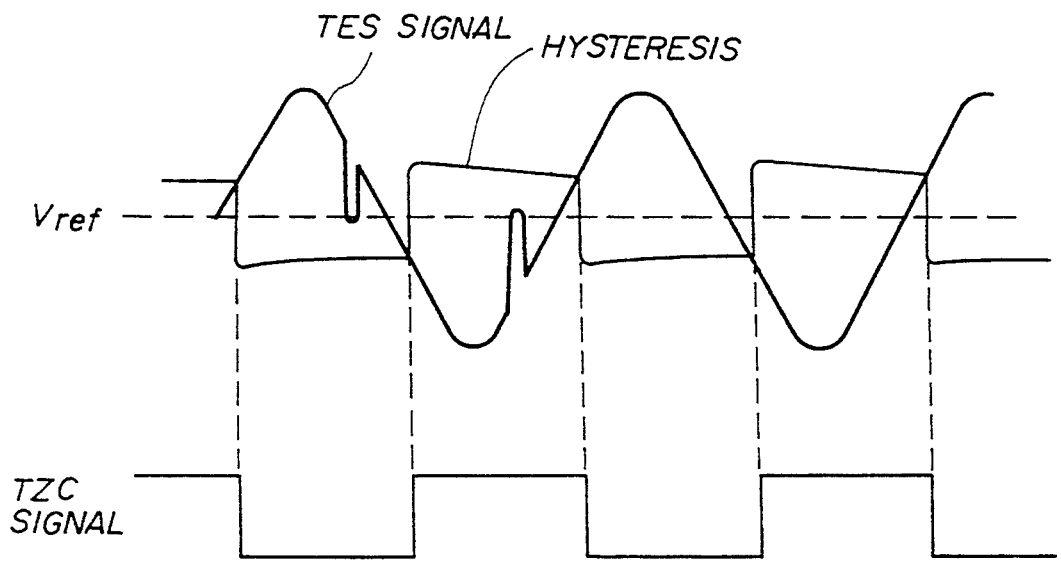

As shown in FIG. 10A, the hysteresis curve is not symmetrical about the analog reference voltage Vref in the initial state. However, due to the result of comparison with the tracking error signal TES, the hysteresis curve immediately becomes symmetrical about the analog reference voltage Vref. The width of the hysteresis with respect to Vref is equal to $Vcc \cdot R3/(R2+R3)$, which must be smaller than the minimum amplitude of the tracking error signal TES. As shown in FOG. 10B, the margin of noise superimposed on the tracking error signal TES is increased, and a margin of offset of the tracking error signal TES is also increased. As a result, it is possible to produce a track zero-cross signal TZC which does not cause erroneous detection and failure of detection.

Figure 11:
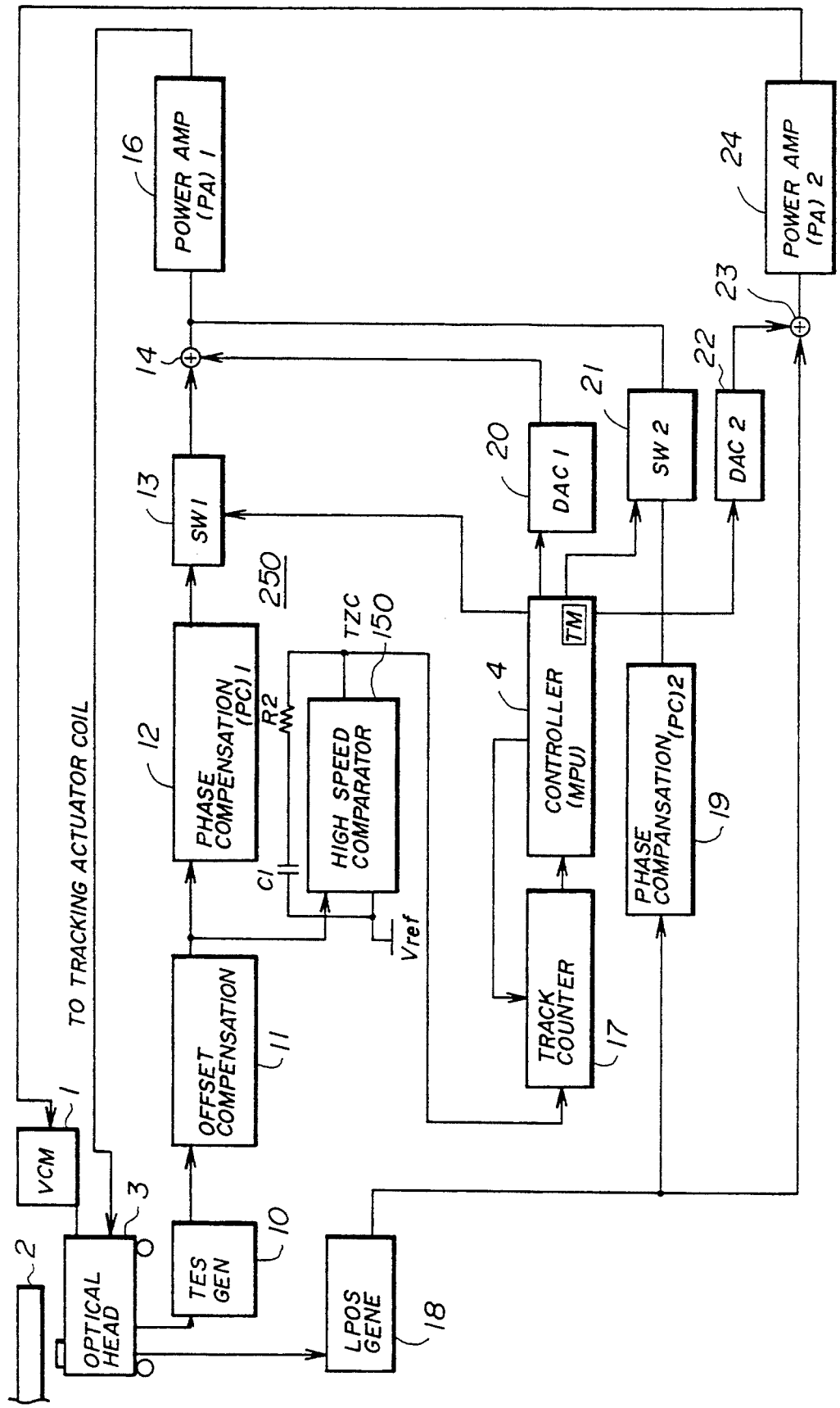
FIG. 11 is a block diagram of an optical disk apparatus according to a second embodiment of the present invention in which the hysteresis comparator shown in FIG. 6 is employed.

A description will now be given, with reference to FIG. 11, of an optical disk apparatus according to a second embodiment of the present invention, in which apparatus the hysteresis comparator according to the first embodiment is employed. In FIG. 11, parts that are the same as parts shown in the previously described figures are given the same reference numbers. The optical disk apparatus shown in FIG. 11 is different from that shown in FIG. 1 in that the former apparatus employs the hysteresis comparator shown in FIG. 6. The resistors R1 and R3 shown in FIG. 6 are omitted from FIG. 11 for the sake of convenience.

Referring to FIG. 12, before the seek operation, the controller 4 writes the number of tracks to be sought into the track counter 17, and outputs an acceleration voltage value to the D/A converter 22. Thereby, the voice coil motor 1 is accelerated by means of the power amplifier 24. At this time, the switch 21 is turned ON, and hence the lens position signal LPOS is applied to the power amplifier 16. In this manner, the tracking actuator coil is servo-controlled to prevent reckless movement and maintain the tracking actuator in the neutral position. In this manner, the optical head 3 is moved, and the tracking error signal generating circuit 10 generates the tracking error signal TES of a sinusodial wave. Further, the hysteresis comparator 250 serving as the tracking zero-cross signal generator generates the tracking zero-cross signal TZC from the tracking error signal TES.

The track counter 17 counts down its counter value in synchronism with each rise of the tracking zero-cross signal TZC, and indicates the number of remaining tracks. The controller 4, which has the internal timer TM, periodically reads the counter value of the track counter 17. Then, the controller 4 calculates a real speed of tracking from the difference between the number of remaining tracks obtained in the current cycle and the number of remaining tracks obtained in the previous cycle.

When the real speed has reached a given speed, the controller 4 terminates the accelerating of the voice coil motor 1. After this, the controller 4 outputs a driving voltage value corresponding to the difference between the real speed and the given speed to the D/A converter 22. When the number of remaining tracks indicated by the track counter 17 has reached a value indicating a given deceleration starting position, the controller 4 outputs, to the D/A converter 22, a driving voltage value corresponding to the difference between the real speed and an instruction speed dependent on a given deceleration curve. In this manner, the voice coil motor 1 is decelerated.

At the end of deceleration, the controller 4 stops outputting the driving voltage value corresponding to the difference between the instruction speed and the real speed, and turns OFF the switch 21. Thereby, the tracking servo control using the lens position signal LPOS is stopped. Then, the controller 4 outputs a deceleration voltage value to the D/A converter 20. In the above manner, the optical head 3 is positioned not only by means of deceleration control of the voice coil motor I but also by control of the tracking actuator, and positioning of the light beam on the target track is rapidly stabilized.

When the optical head 3 has reached the target track, the controller 4 stops the outputting of signals to the D/A converter 20, and turns ON the switch 13 to thereby start the tracking servo control by means of the tracking actuator using the tracking error signal. In addition, the voice coil motor 1 is controlled using the lens position signal LPOS dependent on the quantity of movement of the objective lens 31 by means of the tracking actuator. That is, double-servo control is executed. By the double-servo control, the tracking control is executed by movement of the objective lens 31, while the objective lens 31 is positioned at the center of the target track by movement of the optical head 3 by means of the voice coil motor 1.

A description will now be given of a hysteresis comparator according to a third embodiment of the present invention. In order to facilitate better understanding of the third embodiment, the conventional hysteresis comparator disclosed in the aforementioned Japanese Laid-Open Patent Publication No. 3-36813 will be further described below.

Figure 13A:
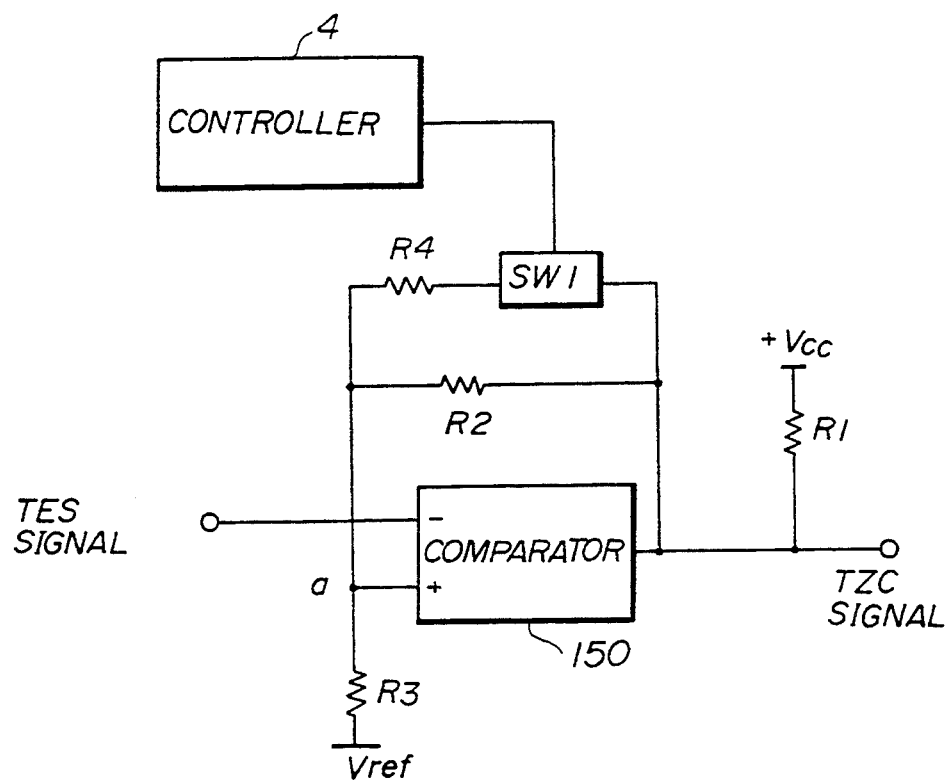
FIGS. 13A and 13B are diagrams of conventional hysteresis
Figure 13B:
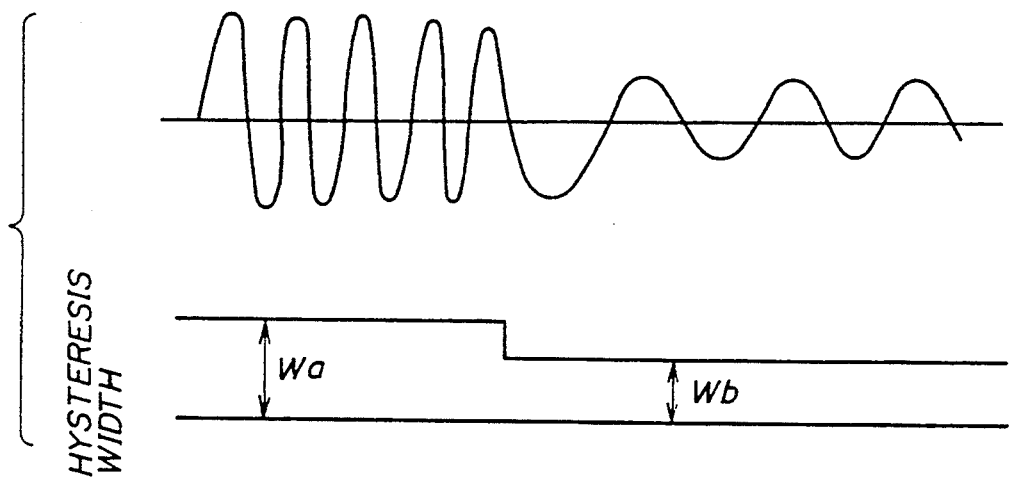

As shown in FIG. 13A, the above publication also proposes a structure in which a resistor R4 is connected in parallel to the resistor R2 by means of a switch SW1, which is turned ON when a large quantity of high-frequency noise exists in a standby mode (the tracking error signal TES is not received) and is turned OFF when the tracking error signal TES is received. By selective connection of the resistor R4, the feedback gain is varied and the hysteresis width is varied, as shown in FIG. 13B. The hysteresis comparator has a large hysteresis width Wa when high-frequency noise is applied thereto, and has a small hysteresis width Wb when the tracking error signal TES is correctly received.

Figure 14:
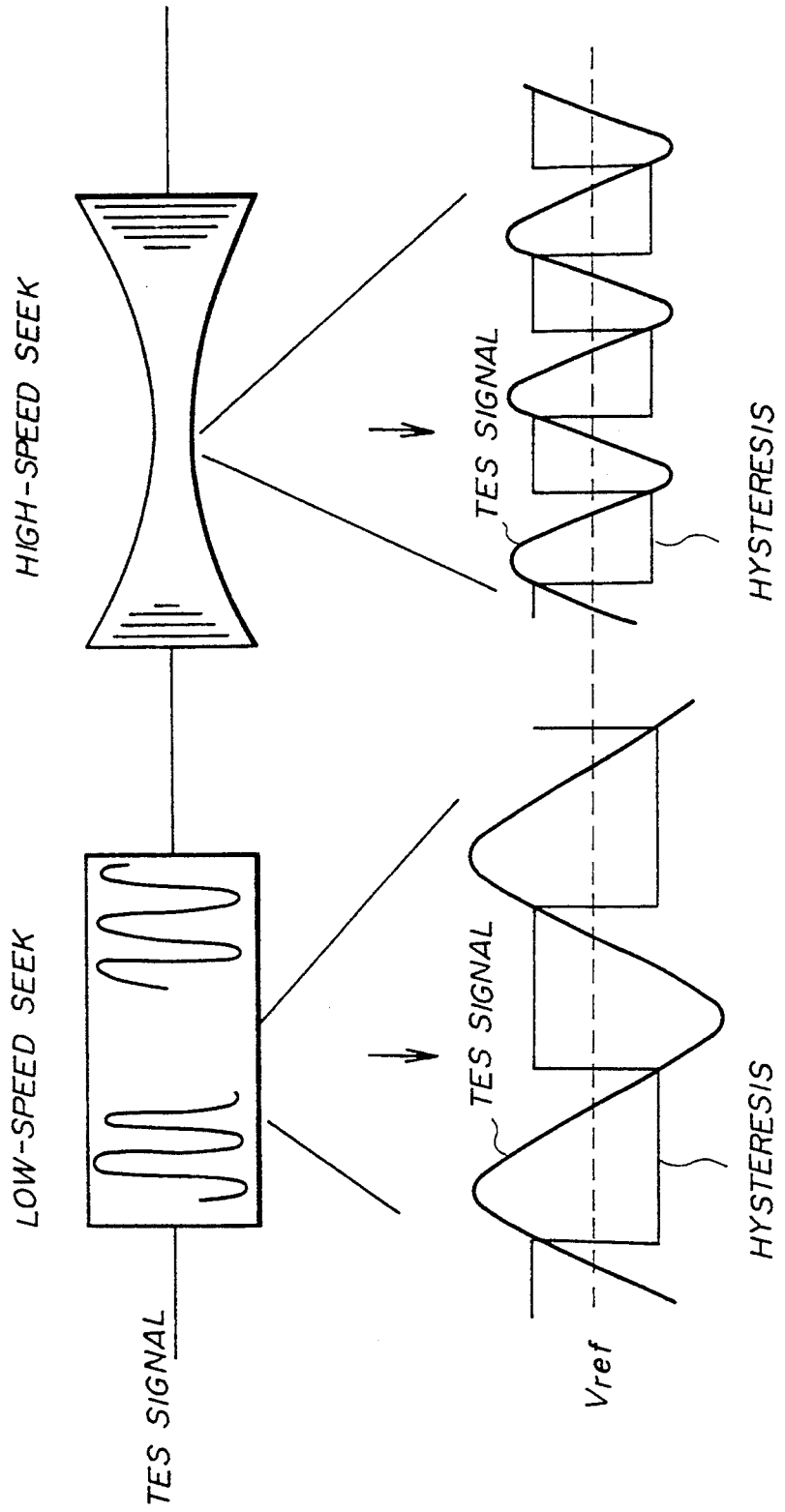
FIG. 14 is a waveform diagram showing disadvantages of the conventional hysteresis comparator shown in FIGS. 13A and 13B.

Disadvantages encountered in the conventional hysteresis comparator shown in FIG. 13A will be described in the following. The tracking error signal TES is a sinusoidal wave of frequency dependent on the movement speed of the optical head 3. Hence, as shown in FIG. 14, the frequency of the tracking error signal TES is low during low-speed seek ((A) of FIG. 14), and is high during high-speed seek ((B) of FIG. 14). As the seek speed increases, the frequency of the tracking error signal TES becomes higher. When seeking a short distance, for example, 100 tracks or less, the optical head 3 is decelerated before the seek speed reaches the maximum value. In this case, the frequency of the tracking error signal TES is low. In long-distance seek, the optical head 3 is decelerated after it reaches the maximum speed. The frequency of the tracking error signal TES is, for example, 500 kHz during high-speed seek. In this case, as shown in (B) of FIG. 14, the amplitude of the tracking error signal TES decreases due to the amplifier and filter characteristics of the tracking error signal generating circuit 10. Generally, the track crossing signal TES has a voltage of 200 mV during the low-speed seek, and a voltage approximately equal to one-third of 200 mV.

Under the above circumstances, the proposed control shown in FIGS. 13A and 13B has the following disadvantages. The small hysteresis width Wb is selected during low-speed seek, and a margin of noise superimposed on the tracking error signal TES is small. As shown in (B) of FIG. 14, the hysteresis width is excessive for the tracking error signal TES obtained during high-speed seek. Hence, the margin of offset of the tracking error signal TES is small.

The hysteresis comparator according to the third embodiment of the present invention is intended to eliminate the above disadvantages.

Figure 15A:
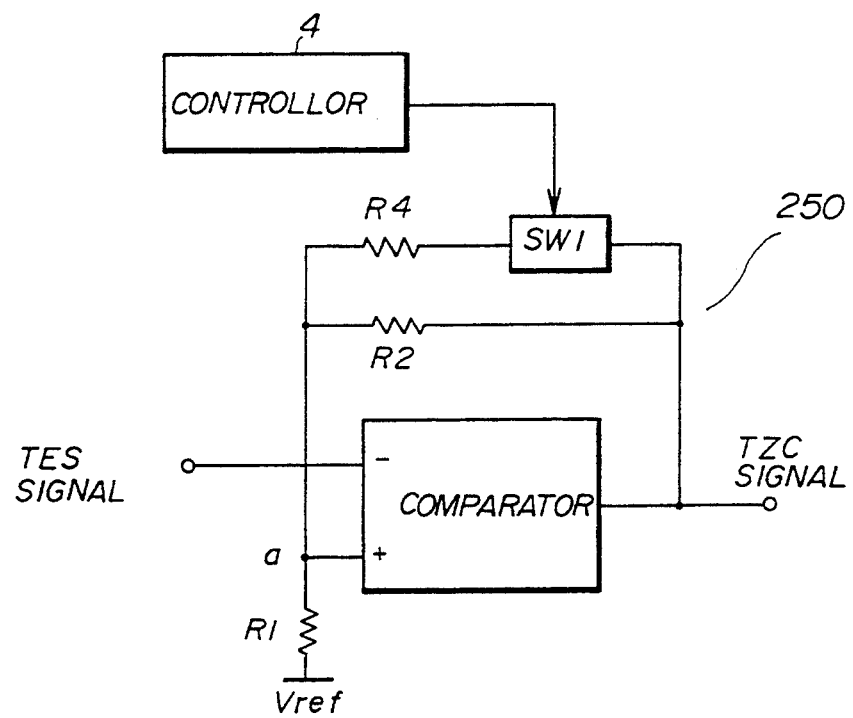
FIGS. 15A and 15B are diagrams of a hysteresis comparator according to a third embodiment of the present invention.
Figure 15B:
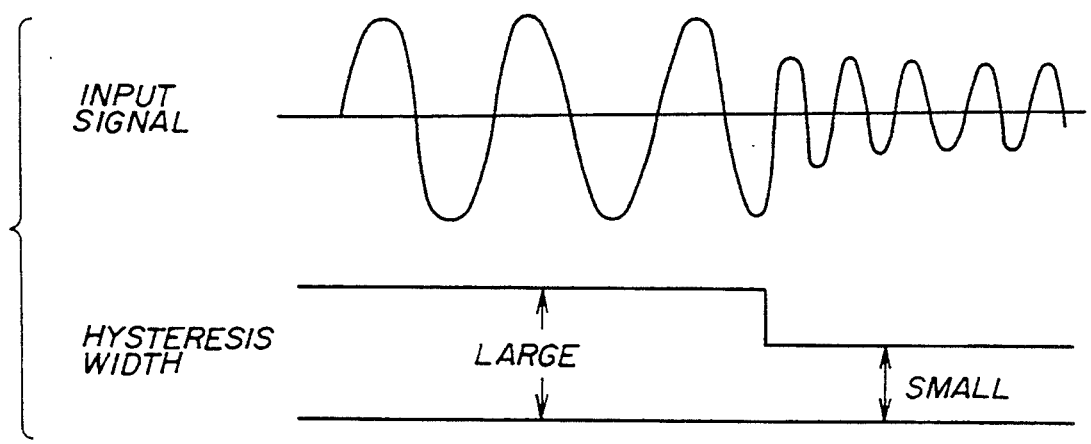

FIG. 15A shows an overview of the hysteresis comparator 250 according to the third embodiment of the present invention. In FIG. 15A, parts that are the same as parts shown in the previously described figures are given the same reference numbers. As shown in FIG. 15B, the controller 4 controls the switch SW1 so that the hysteresis width is large when the frequency of the tracking error signal TES is low, and is small when the frequency of the tracking error signal TES is high. Thereby, it is possible to generate a rectangular waveform from the tracking error signal TES having the amplitude varying in accordance with the frequency thereof and hence enhance margins to noise and offset.

Figure 2A:
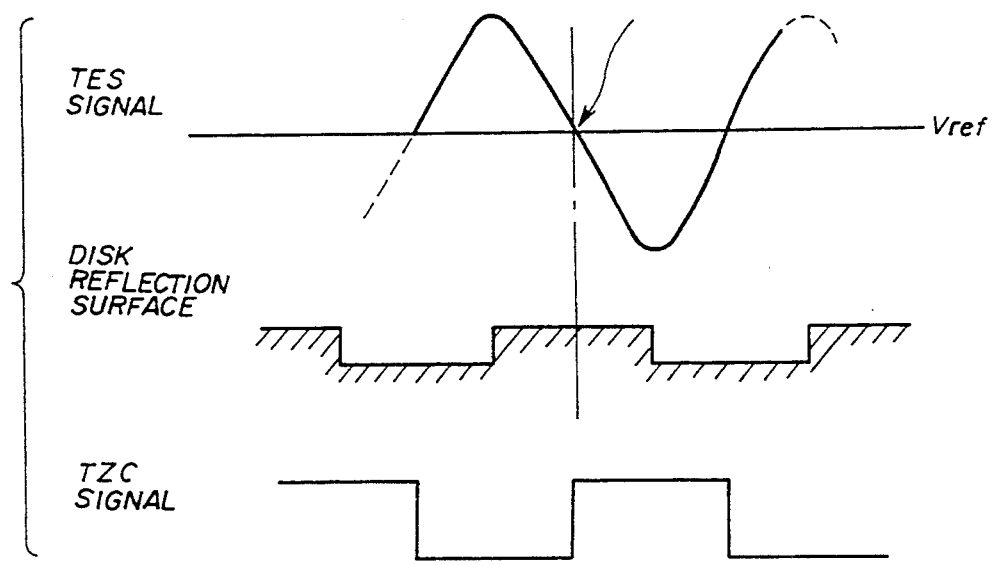
FIGS. 2A, 2B and 2C are diagrams showing a tracking zero-cross signal.
Figures 2B, 2C:
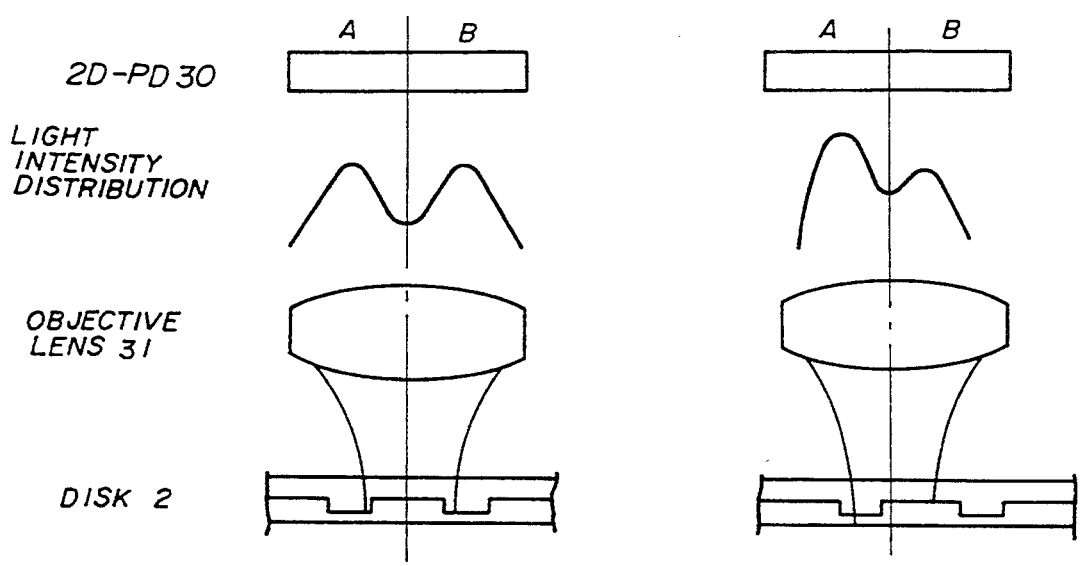
Figure 3A:
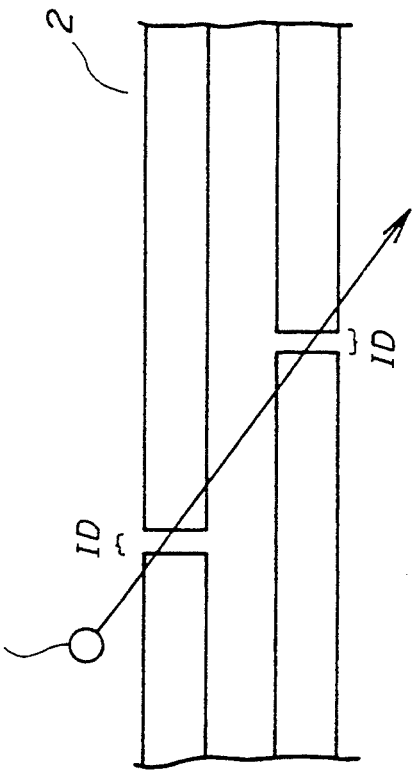
FIGS. 3A and 3B are diagrams showing a track crossing operation.
Figure 3B:
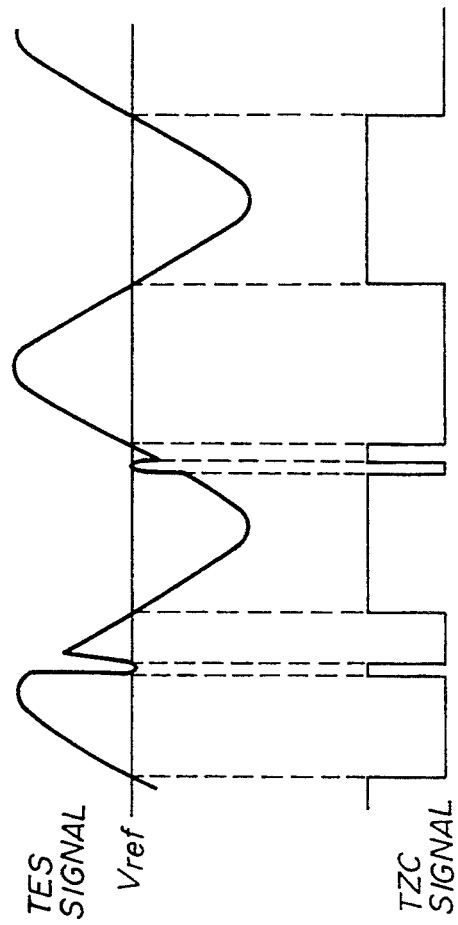
Figure 4A:
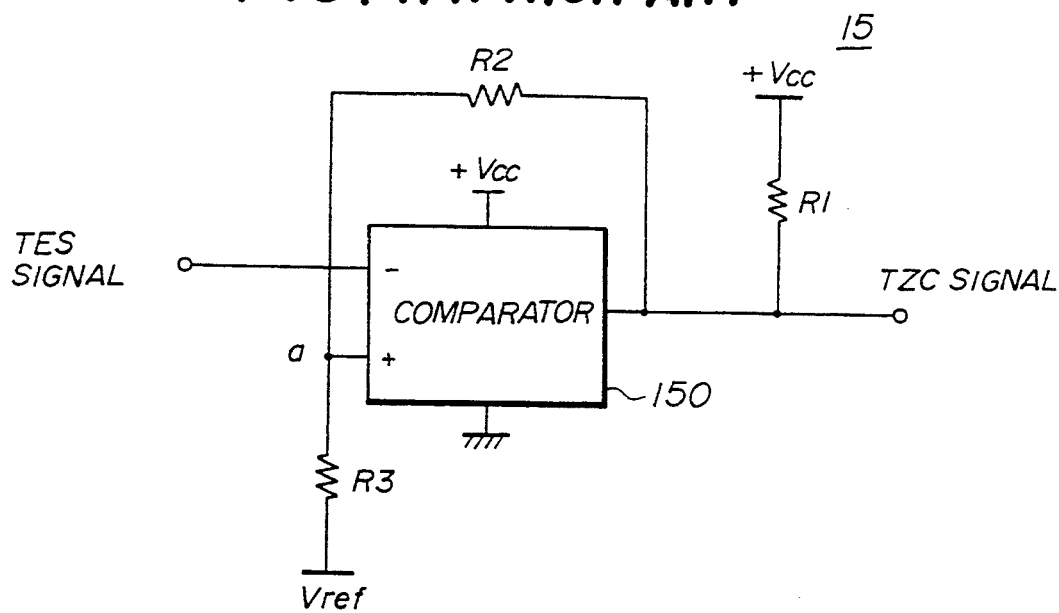
FIGS. 4A, 4B and 4C are circuit diagrams showing a conventional hysteresis comparator used in the conventional optical disk apparatus.
Figure 4B:
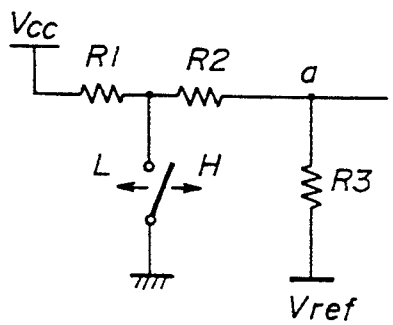
Figure 4C:
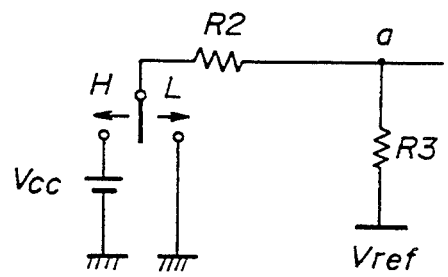
Figure 5A:
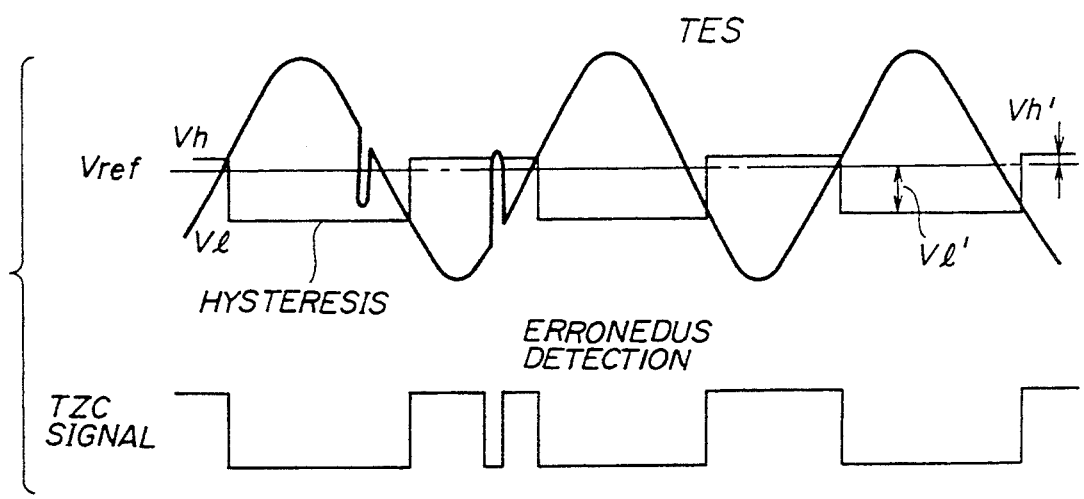
FIGS. 5A and 5B are diagrams showing disadvantages of the conventional hysteresis comparator shown in FIGS. 4A, 4B
Figure 5B:
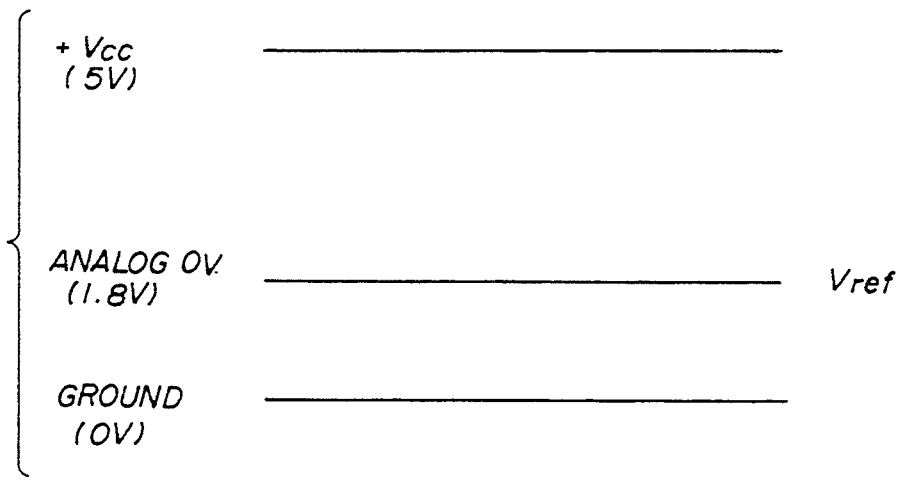

Assuming that only the feedback resistor R2 is connected in the configuration shown in FIG. 15A, the equivalent circuit thereof is as shown in FIGS. 4B and 4C. As has been described previously with reference to FIGS. 4B and 4C, the potential Vh of the node a observed when the output signal of the hysteresis comparator is at the high level is written as follows:

$$Vh = [R3/(R2 + R3)](Vcc - Vref) + Vref$$
$$= (R3 \cdot Vcc + R2 \cdot Vref)/(R2 + R3).$$

Further, the potential V1 of the node a observed when the output signal is at the low level is written as follows:

$$Vl = [R3/(R2 + R3)](0 - Vref) + Vref$$
$$= (R2 \cdot Vref)/(R2 + R3).$$

Hence, the hysteresis width is equal to (Vh−Vl), and thus equal to R3·Vcc/(R2+R3). When the switch SW1 is turned OFF, the hysteresis width W2 is equal to RS·Vcc/(R2+RS). On the other hand, when the switch SW 1 is turned ON, the hysteresis width W1 is equal to R3·Vcc/(R'+R3) where R'=R2·R4/(R2+R4). Since R2>R', then W2<W1.

Figure 16:
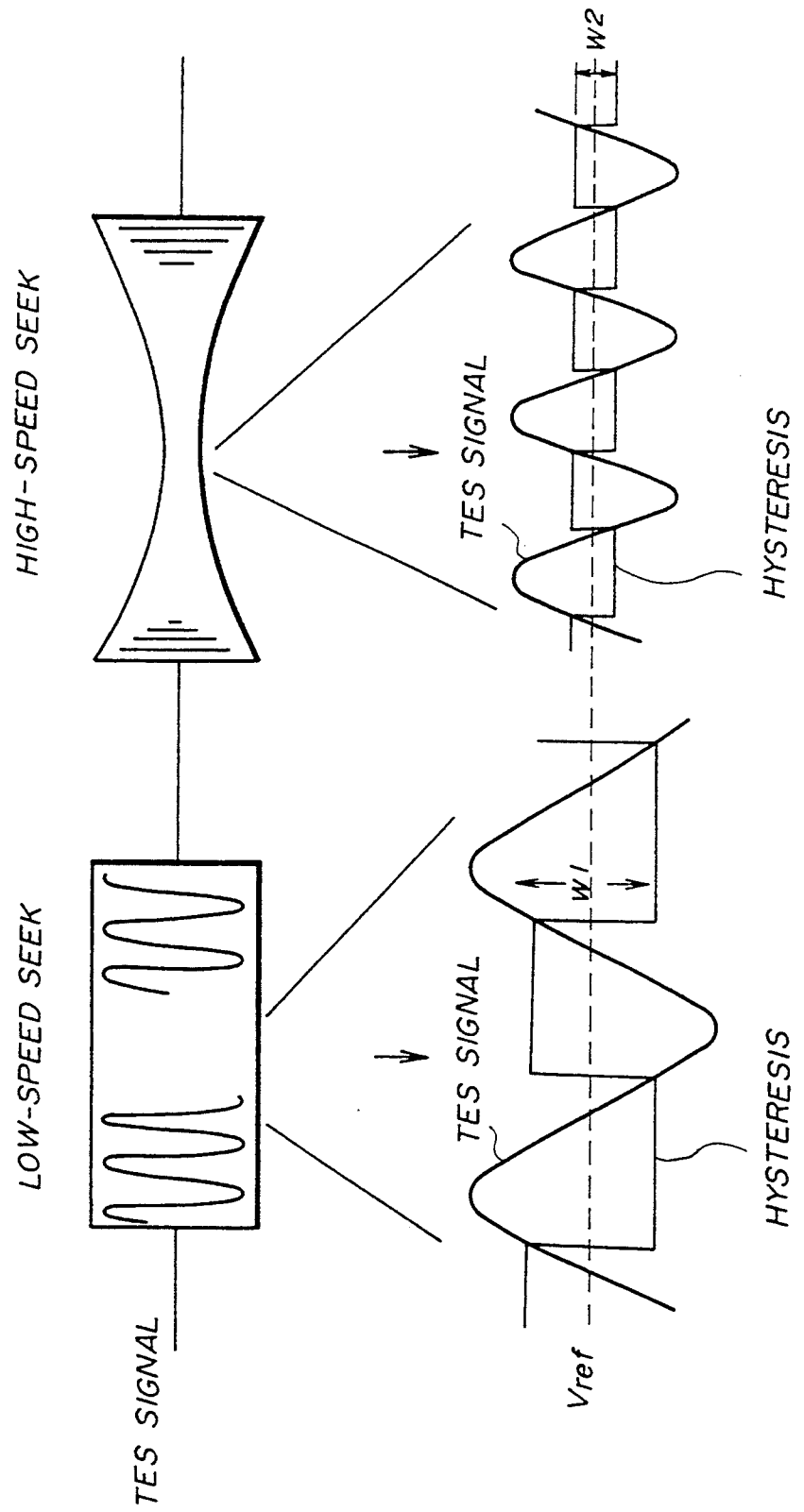
FIG. 16 is a waveform diagram showing the operation of the hysteresis comparator shown in FIGS. 15A and 15B.

Hence, as shown in FIG. 16, the switch SW1 is turned ON and the hysteresis width is set to W1 when the frequency of the tracking error signal TES is low ((A) of FIG. 16). Further, the switch SW1 is turned OFF and the hysteresis width is set to W2 when the frequency of the tracking error signal TES is high ((B) of FIG. 16). In this way, it is possible to generate a rectangular wave dependent on the amplitude of the tracking error signal TES and to provide sufficient margins of noise and offset.

It should be noted that the frequency of the tracking error signal TES is low during a short-distance seek and that the switch SW1 is turned ON in that case. Thereby, a large hysteresis width is set since the amplitude of the tracking error signal TES is not limited in the tracking error signal generating circuit 10. In long-distance seek, the frequency of the tracking error signal TES is high, and the switch SW1 is turned OFF. Thereby, a small hysteresis width is set since the amplitude of the tracking error signal is limited in the tracking error signal generating circuit 10.

The switch SW1 can be formed with an analog switch, such as an FET (Field Effect Transistor).

Figure 17:
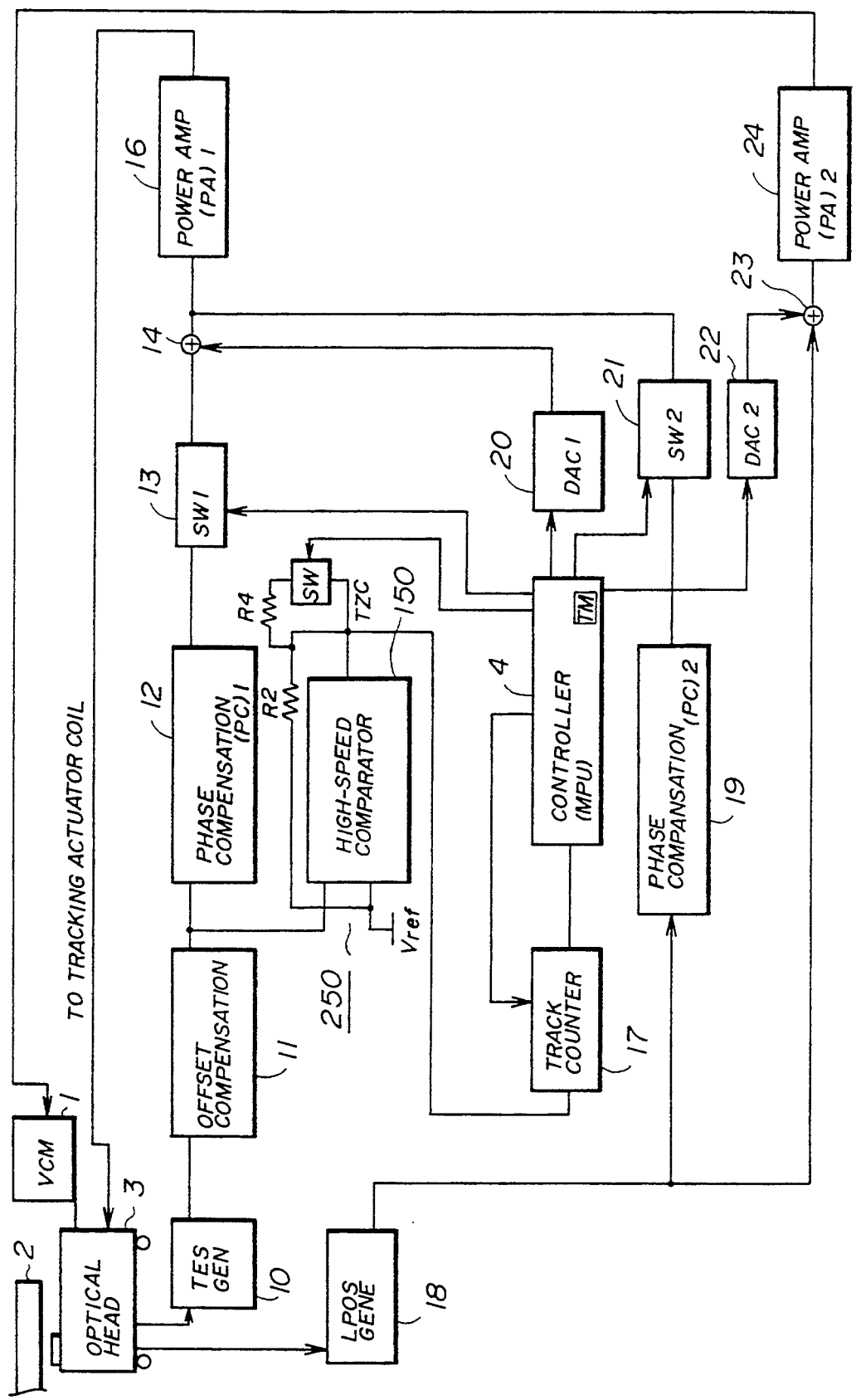
FIG. 17 is a block diagram of an optical disk apparatus according to a fourth embodiment of the present invention in which the hysteresis comparator according to the third embodiment of the present invention is employed.

FIG. 17 is a block diagram of an optical disk apparatus according to a fourth embodiment of the present invention in which the hysteresis comparator 250 shown in FIG. 15A is employed. In FIG. 17, parts that are the same as parts shown in the previous figures are given the same reference numbers. The optical disk apparatus shown in FIG. 17 can be obtained by substituting the hysteresis comparator 250 for the hysteresis comparator 150 shown in FIG. 11. The operation of the optical disk apparatus shown in FIG. 17 is almost the same as that of the optical disk apparatus shown in FIG. 11.

Figure 18:
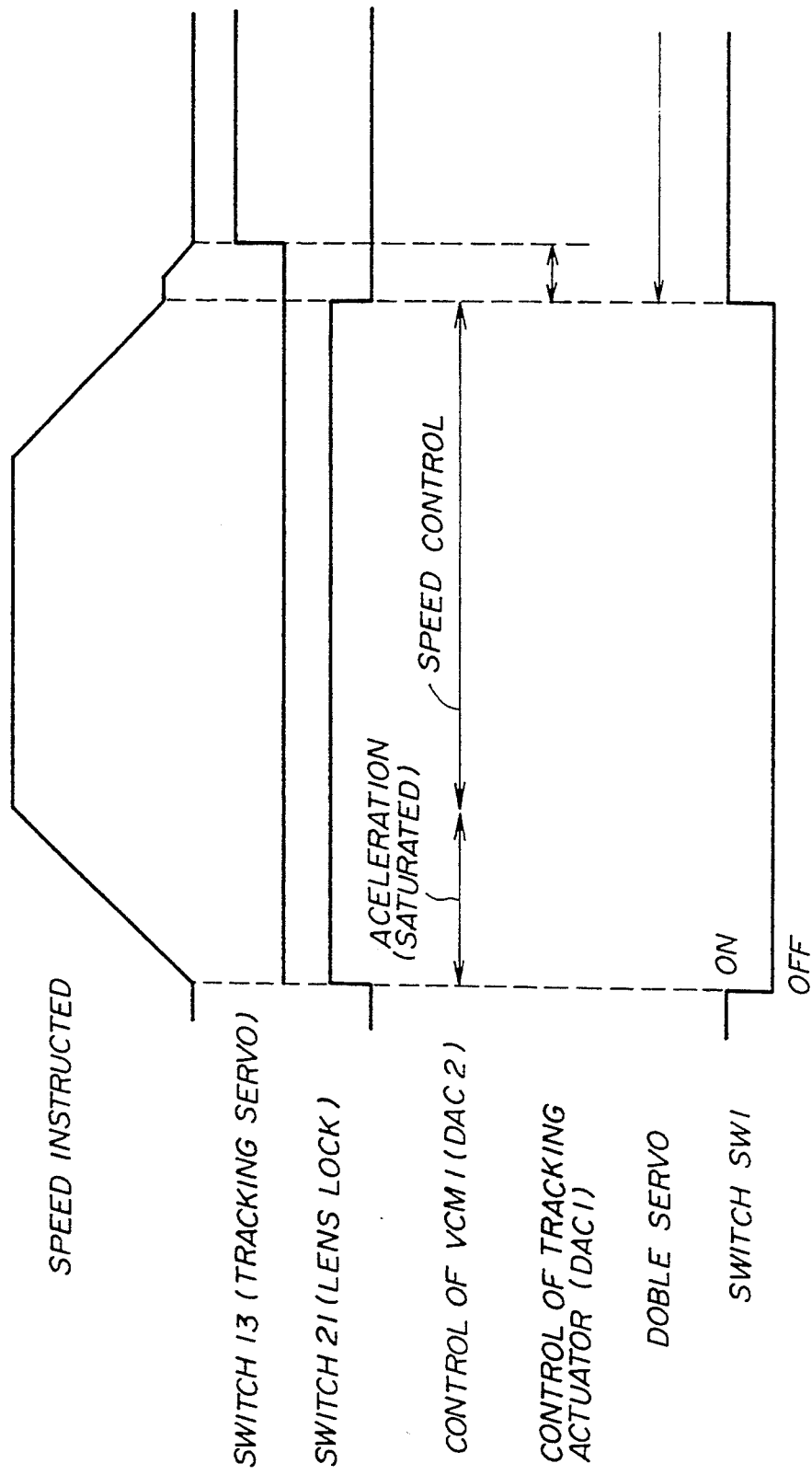
FIG. 18 is a waveform diagram illustrating the operation of the optical disk apparatus shown in FIG. 17.

A description will now be given, with reference to FIG. 18, of the operation of the optical disk apparatus shown in FIG. 17. Before the seek operation, the controller 4 writes the number of tracks to be sought into the track counter 17, and turns OFF the switch SW1, so that a small hysteresis width $2 is set. Further, the controller 4 outputs an acceleration voltage value to the D/A converter 22. Thereby, the voice coil motor 1 is accelerated by means of the power amplifier 24. At this time, the switch 21 is turned ON, and hence the lens position signal LPOS is applied to the power amplifier 18. In this manner, the tracking actuator coil is servo-controlled to prevent reckless movement and maintain the tracking actuator in the neutral position. In this manner, the optical head 3 is moved, and the tracking error signal generating circuit 10 generates the tracking error signal TES having a sinusoidal wave. Further, the hysteresis comparator 250 serving as the tracking zero-cross signal generator generates the tracking zero-cross signal TZC from the tracking error signal TES.

The track counter 17 counts down its counter value in synchronism with each rise of the tracking zero-cross signal TZC, and indicates the number of remaining tracks. The controller 4, which has the internal timer TM, periodically reads the counter value of the track counter 17. Then, the controller 4 calculates a real speed of tracking from the difference between the number of remaining tracks obtained in the current cycle and the number of remaining tracks obtained in the previous cycle.

When the real speed has reached a given speed, the controller 4 terminates the accelerating of the voice coil motor 1. After this, the controller 4 outputs a driving voltage value corresponding to the difference between the real speed and the given speed to the D/A converter 22. When the number of remaining tracks indicated by the track counter 17 has reached a value indicating a given deceleration starting position, the controller 4 outputs, to the D/A converter 22, a driving voltage value corresponding to the difference between the real speed and an instruction speed dependent on a given deceleration curve. In this manner, the voice coil motor 1 is decelerated.

At the end of deceleration, the controller 4 stops outputting the driving voltage value corresponding to the difference between the instruction speed and the real speed, and turns OFF the switch Thereby, the tracking servo control using the lens position signal LPOS is stopped. Then, the controller 4 outputs a deceleration voltage value based on the real speed to the D/A converter 20. Thereby, the tracking actuator is controlled via the power amplifier (lens seek).

At this time, the frequency of the tracking error signal TES is low, and the tracking error signal TES is released from the amplitude limitation. Hence, the controller 4 turns ON the switch SW1, and thereby increases the hysteresis width. In this manner, the optical head 3 is positioned by means of not only deceleration control of the voice coil motor 1 but also by control of the tracking actuator. Hence, positioning of the light beam on the target track rapidly stabilized.

When the optical head 3 has reached the target track, the controller 4 stops the outputting of signals to the D/A converter 20, and turns ON the switch 13 to thereby start the tracking servo control by means of the tracking actuator using the tracking error signal. In addition, the voice coil motor 1 is controlled using the lens position signal LPOS dependent on the quantity of movement of the objective lens 31 by means of the tracking actuator. That is, double-servo control is executed. By the double-servo control, the tracking control is executed by movement of the objective lens 31, while the objective lens is positioned at the center of the target track by movement of the optical head 3 by means of the voice coil motor 1.

In the above manner, the tracking zero-cross signal TZC for obtaining the track position and the real speed in the controller 4 are generated from the tracking error signal which is sliced according to the hysteresis characteristic having the variable hysteresis width dependent on the amplitude of the tracking error signal TES. Hence, it is possible to generate the correct tracking zero-cross signal TZC irrespective of noise superimposed on the tracking error signal TES and the offset thereof under the condition where the amplitude of the tracking error signal TES varies. Further, the small hysteresis width W2 is set when seek is started and the frequency of the tracking error signal TES increases. Then, a large hysteresis width W1 is set in the final stage of the seek operation in which the frequency of the tracking error signal TES becomes low. In this manner, an optimum hysteresis widths can be selected dependent on variations in the amplitude of the tracking error signal TES.

Figure 19:
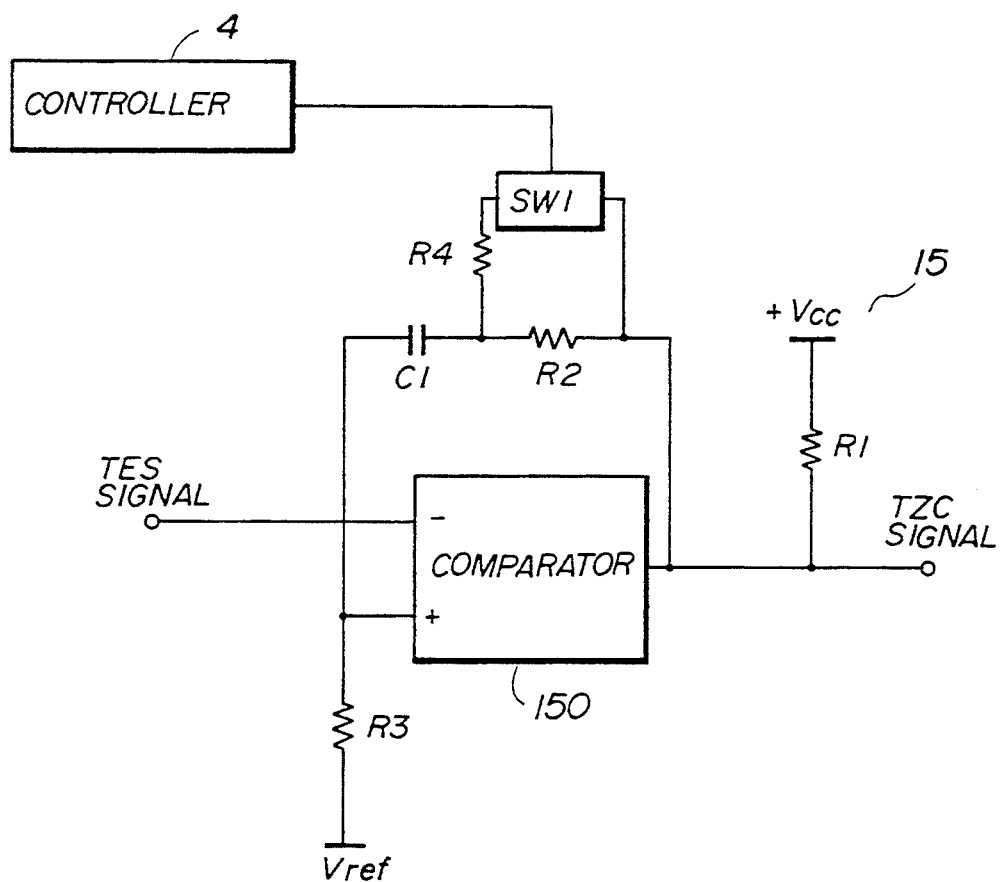
FIG. 19 is a diagram of a hysteresis comparator according to a fifth embodiment of the present invention.

FIG. 19 shows a hysteresis comparator 350 according to a fifth embodiment of the present invention. In FIG. 19, parts that are the same as parts shown in the previously described figures are given the same reference numbers. The third embodiment of the present invention corresponds to a combination of the first and third embodiments thereof. The resistor R4 is connected to the resistor R2 in parallel via the switch SW1. The fifth embodiment has both the advantages of the first and third embodiments. That is, the feedback quantity is not affected by the analog reference voltage Vref since data obtained by differentiating variations in the output voltage of the comparator 150 is fed back to the positive input terminal thereof. Further, the hysteresis width is varied in accordance with variations in the amplitude of the tracking error signal TES since the feedback quantity is varied in accordance therewith.

Figure 20:
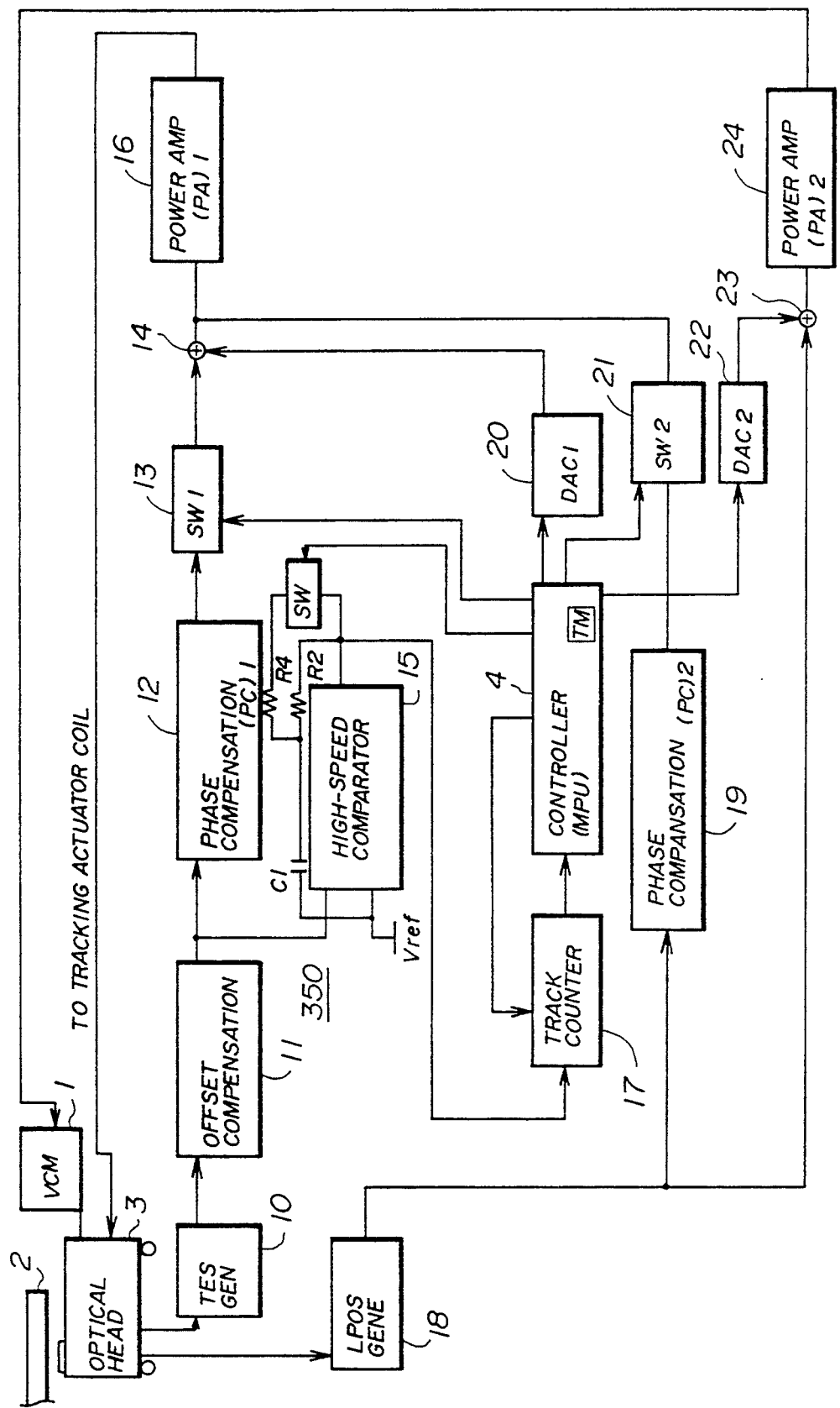
FIG. 20 is a block diagram of an optical disk apparatus according to a sixth embodiment of the present invention in which the hysteresis comparator according to the fifth embodiment of the present invention is employed.

FIG. 20 is a block diagram of an optical disk apparatus according to a sixth embodiment of the present invention, in which the hysteresis comparator 350 shown in FIG. 19 is used. In FIG. 20, parts that are the same as parts shown in the previously described figures are given the same reference numbers. The operation of the optical disk apparatus shown in FIG. 20 will be obvious from the aforementioned operations of the second and fourth embodiments of the present invention as well as the aforementioned operation of the hysteresis comparator 350 shown in FIG. 19. Hence, a description of the operation of the optical disk apparatus shown in FIG. 20 will be omitted here.

The present invention is not limited to the specifically disclosed embodiments, and variations and modifications may be made without departing from the scope of the present invention.

The present invention includes a magneto-optic disk apparatus. It is to be noted that in lieu of the negative feedback, a positive feedback can be employed. That is, the output signal of the comparator 150 may be fed back to the negative input terminal thereof. A plurality of series circuits, each including a capacitor and a resistor, can be provided in parallel with each other, and one of them can be selected. In this manner, the hysteresis width can be changed.

What is claimed is

1. A disk storage apparatus comprising:
an optical scanning system movable with respect to a disk-shaped medium, said optical scanning system generating an electric read signal obtained by optically scanning the disk-shaped medium;
reproducing means, coupled to said optical scanning system, for reproducing information from the electric read signal;
seek control means, coupled to said optical scanning system, for controlling a seek speed so that the optical scanning system can move to a target track on the disk-shaped medium;
position error signal generating means for generating a position error signal from said electric signal, said position error signal indicating an error in a position of tracking by means of said optical scanning system; and
a rectangular wave generator,
said rectangular wave generator including:
a comparator having a first input terminal receiving said position error signal, a second input terminal, and an output terminal, the comparator slicing the position error signal at a hysteresis voltage so that a rectangular wave corresponding to said seek control signal is output via the output terminal; and
a feedback circuit connected between the output terminal and the second input terminal, said feedback circuit including means for changing a feedback quantity in accordance with variations of the seek speed.

2. A disk storage apparatus as claimed in claim 1, wherein said feedback circuit has a time constant which attenuates the position error signal in an attenuation time longer than a cycle of the position error signal.

3. A disk storage apparatus as claimed in claim 1, wherein said feedback circuit has a feedback quantity less than an amplitude of the position error signal.

4. A disk storage apparatus as claimed in claim 1, further comprising feedback control means for changing a feedback quantity of said feedback circuit in accordance with variations in a frequency of the position error signal.

5. A disk storage apparatus as claimed in claim 4, wherein said feedback control mans comprises means for changing the feedback quantity so that a hysteresis width of the hysteresis voltage decreases as the frequency of the position error signal becomes higher.

6. A disk storage apparatus as claimed in claim 1, wherein said feedback circuit comprises a first resistor and a capacitor connected in series.

7. A disk storage apparatus as claimed in claim 6, wherein:
   said feedback circuit further comprises a series circuit comprising a second resistor and a switch; and
   said series circuit being connected to said first resistor in parallel.

8. A disk storage apparatus as claimed in claim 7, further comprising feedback control means, coupled to said series circuit, for controlling said switch in accordance with a frequency of said position error signal so that a hysteresis width of the hysteresis voltage decreases as the frequency of the position error signal becomes higher.

9. A disk storage apparatus comprising
   an optical scanning system movable with respect to a disk-shaped medium, said optical scanning system generating an electric read signal obtained by optically scanning the disk-shaped medium;
   reproducing means, coupled to said optical scanning system, for reproducing information from the electric read signal; and
   seek control means, coupled to said optical scanning system, for generating a seek control signal from said electric read signal,
   said seek control means comprising:
   position error signal generating means for generating a position error signal from said electric read signal, said position error signal indicating an error in a position of tracking by means of said optical scanning system; and
   a rectangular wave generator,
   said rectangular wave generator comprising:
   a comparator having a first input terminal receiving said position error signal, a second input terminal, and an output terminal, the comparator sliding the position error signal at a hysteresis voltage so that a rectangular wave corresponding to said seek control signal is output via the output terminal; and
   a feedback circuit connected between the output terminal and the second input terminal, said feedback circuit comprising feedback control means for changing a feedback quantity of said feedback circuit in accordance with variations in a frequency of the position error signal.

10. A disk storage apparatus as claimed in claim 9, wherein said feedback circuit further comprises:
    a first resistor connected to the output terminal of said comparator and to the second input terminal; and
    a series circuit comprising a second resistor and a switch, said series circuit being connected to said first resistor in parallel,
    wherein said control means comprises means or controlling the switch so that a hysteresis width of the hysteresis voltage decreases as the frequency of the position error signal becomes higher.

11. A disk storage apparatus as claimed in claim 10, wherein said feedback circuit further comprises a capacitor inserted between said first resistor and said second input terminal of said comparator.

* * * * *

UNITED STATES PATENT AND TRADEMARK OFFICE
CERTIFICATE OF CORRECTION

PATENT NO. : 5,351,222
DATED : September 27, 1994
INVENTOR(S) : Ikeda et al.

It is certified that error appears in the above-indentified patent and that said Letters Patent is hereby corrected as shown below:

Column 2, line 20, delete "81" and insert --31--.

Column 2, line 28, before "converts" insert --20--.

Column 2, line 60, after "comparator" insert --150,--.

Column 3, line 59, delete "voltage-" and insert --voltage.--.

Column 3, line 66, delete "(+SV)" and insert --(+5V)--.

Column 4, line 31, after "large" insert --in--.

Column 5, line 34, after "and" insert --4C;--.

UNITED STATES PATENT AND TRADEMARK OFFICE
CERTIFICATE OF CORRECTION

PATENT NO. : 5,351,222
DATED : September 27, 1994
INVENTOR(S) : Ikeda et al.

It is certified that error appears in the above-indentified patent and that said Letters Patent is hereby corrected as shown below:

Column 5, line 54, after "hystersis" insert -- comparator;--.

Column 6, line 53, delete "RS" and insert --R3--.

Column 6, line 60, delete "RS" and insert --R3--.

Column 6, line 68, move "(5)" to right margin.

Column 8, line 46, delete "≤" and insert --=--.

Column 8, line 46, delete "$e^{-5/[C1(R2+R3)]}$" and insert --$e^{-t/[C1(R2+R3)]}$--.

Column 8, line 50, delete "$e^{-5/[C1(R2+R3)]}$" and insert --$e^{-t/[C1(R2+R3)]}$--.

UNITED STATES PATENT AND TRADEMARK OFFICE
CERTIFICATE OF CORRECTION

PATENT NO. : 5,351,222           Page 3 of 4
DATED : September 27, 1994
INVENTOR(S) : Ikeda et al.

It is certified that error appears in the above-indentified patent and that said Letters Patent is hereby corrected as shown below:

Column 8, line 67, delete "RB" and insert --R3--.

Column 9, line 16, delete "FOG" and insert --FIG--.

Column 11, line 28, delete "of:the" and insert --of the--.

Column 11, line 54, delete "Vi" and insert --V1--.

Column 11, line 57, delete "RS*Vcc/(R2+RS)" and insert --R3*Vcc/(R2+R3)--.

Column 12, line 33, delete "$2" and insert --S2--.

Column 12, line 39, delete "18" and insert --16--.

Column 13, line 7, after "switch" and insert --21.--.

UNITED STATES PATENT AND TRADEMARK OFFICE
CERTIFICATE OF CORRECTION

PATENT NO. :
DATED      :    5,351,222
INVENTOR(S):    September 27, 1994
                Ikeda et al.

It is certified that error appears in the above-indentified patent and that said Letters Patent is hereby corrected as shown below:

Column 13, line 21, after "track" insert --is--.

Column 15, line 27, after "comprising" insert --:--.

Column 16, line 11, delete "sliding" and insert --slicing--.

Column 16, line 29, delete "or" and insert --for--.

Signed and Sealed this

Nineteenth Day of December, 1995

Attest:

BRUCE LEHMAN

Attesting Officer

Commissioner of Patents and Trademarks